United States Patent [19]
Rando

[11] Patent Number: 5,287,627
[45] Date of Patent: Feb. 22, 1994

[54] AUTOMATIC PLUMB AND LEVEL TOOL WITH ACOUSTIC MEASURING CAPABILITY

[75] Inventor: Joseph F. Rando, Los Altos Hills, Calif.

[73] Assignee: Spectra-Physics Laserplane, Inc., Dayton, Ohio

[21] Appl. No.: 984,320

[22] Filed: Dec. 2, 1992

Related U.S. Application Data

[63] Continuation-in-part of Ser. No. 714,240, Jun. 12, 1991, Pat. No. 5,182,863, which is a continuation-in-part of Ser. No. 602,353, Oct. 22, 1990, Pat. No. 5,075,977.

[51] Int. Cl.$^5$ ............................................. G01C 1/02
[52] U.S. Cl. .................................... 33/227; 33/290; 33/DIG. 21; 33/700; 367/99
[58] Field of Search ................. 33/227, 228, DIG. 21, 33/290, 291, 700; 367/99, 107, 108, 127, 118; 356/138, 146, 147, 250

[56] References Cited
U.S. PATENT DOCUMENTS

| | | | |
|---|---|---|---|
| 3,897,637 | 8/1975 | Genho | 33/227 |
| 3,909,952 | 10/1975 | Lagasse | 33/227 |
| 4,417,816 | 11/1983 | Kindl et al. | 33/DIG. 21 |
| 4,852,265 | 8/1989 | Rando et al. | 33/227 |
| 4,910,717 | 3/1990 | Terry | 367/99 |
| 4,953,141 | 8/1990 | Novak et al. | 367/99 X |
| 5,075,977 | 12/1991 | Rando | 33/227 |
| 5,182,863 | 2/1993 | Rando | 33/227 |
| 5,218,770 | 6/1993 | Toga | 33/DIG. 21 |

FOREIGN PATENT DOCUMENTS 68229822A 10/1990 United Kingdom.

*Primary Examiner*—William A. Cuchlinski, Jr.
*Assistant Examiner*—G. Bradley Bennett
*Attorney, Agent, or Firm*—Killworth, Gottman, Hagan & Schaeff

[57] ABSTRACT

An automatic plumb, level, pointing and distance measuring tool uses a visible laser diode to project a beam in any of several different modes through a beam exit window. The tool, approximately the size and shape of a tape measure, can be placed on one edge to project a tilt-compensated vertical beam. Placed on another edge 90°-rotated, the tool projects through the same exit window a tilt-compensated horizontal beam. When laid on either of its larger flat sides, the tilt compensation becomes inoperative and the tool projects a beam which is fixed relative to the housing. Acoustic distance measurement is facilitated using a second component or target side device which receives both a light beam an acoustic signal simultaneously projected from the laser tool across a space to be measured. A receiver in the target side device first detects arrival of a characteristically modulated or pulsed light beam, received at a photodetector on the target side device, and then receives the acoustic signal. A clock starts when the light beam is detected and stops when the acoustic signal is received. The acoustic transit time is thereby clocked and distance is calculated and displayed. The use of a single acoustic transit time, without reflection increases distance measuring range. Also, the visible laser beam projected between the two components provides a clear visual indication of the distance to be measured.

19 Claims, 12 Drawing Sheets

$N = 1.45$ (OIL)

$N \sin\theta = \sin\phi$ $N = \dfrac{\sin\phi}{\sin\theta} \approx \dfrac{\phi}{\theta} \approx N$

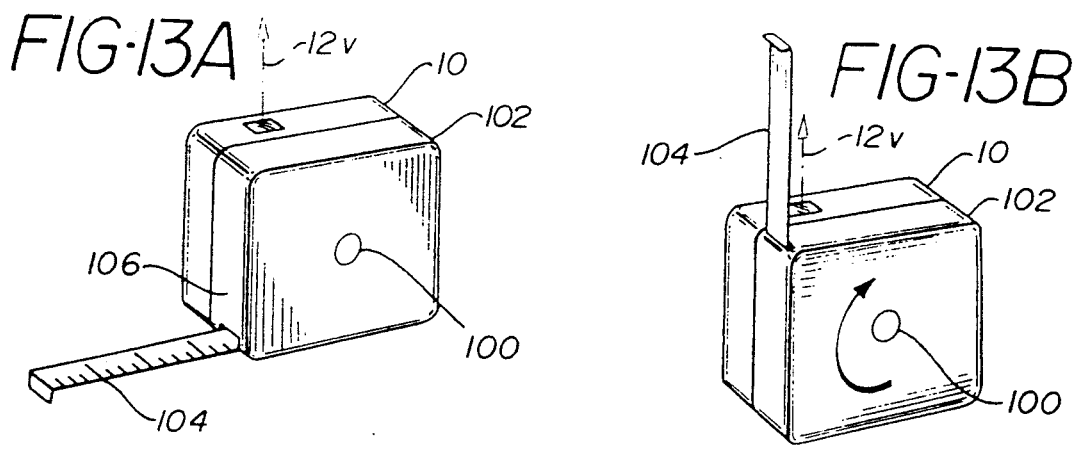
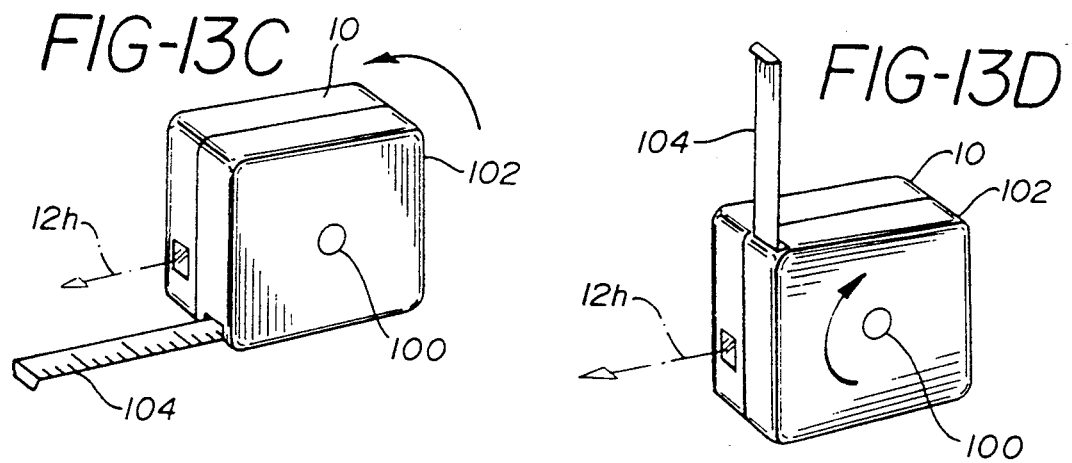
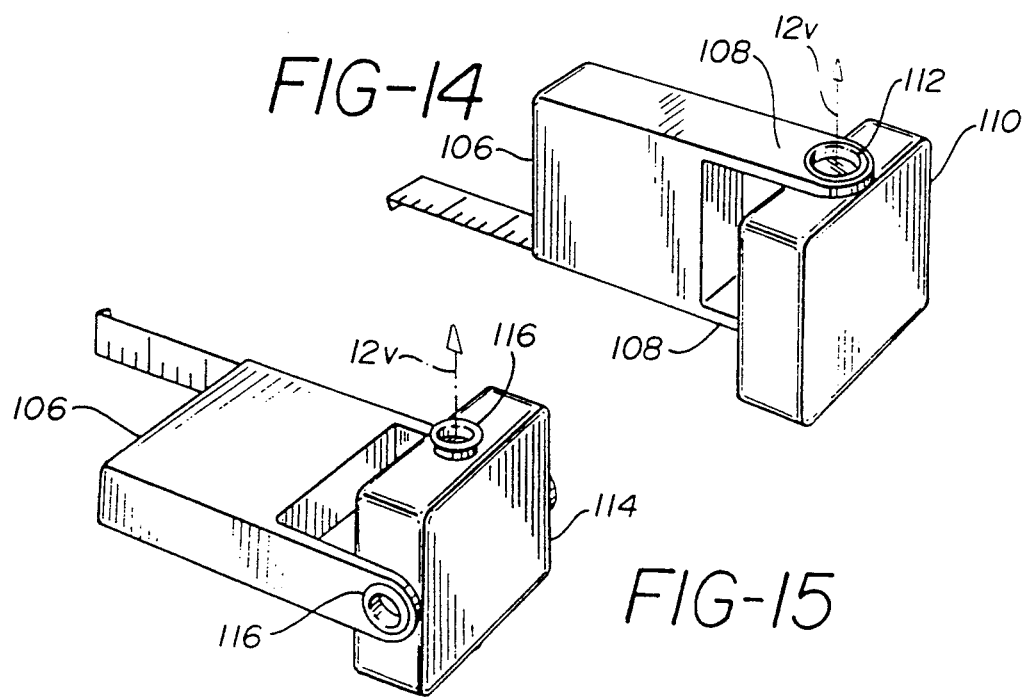

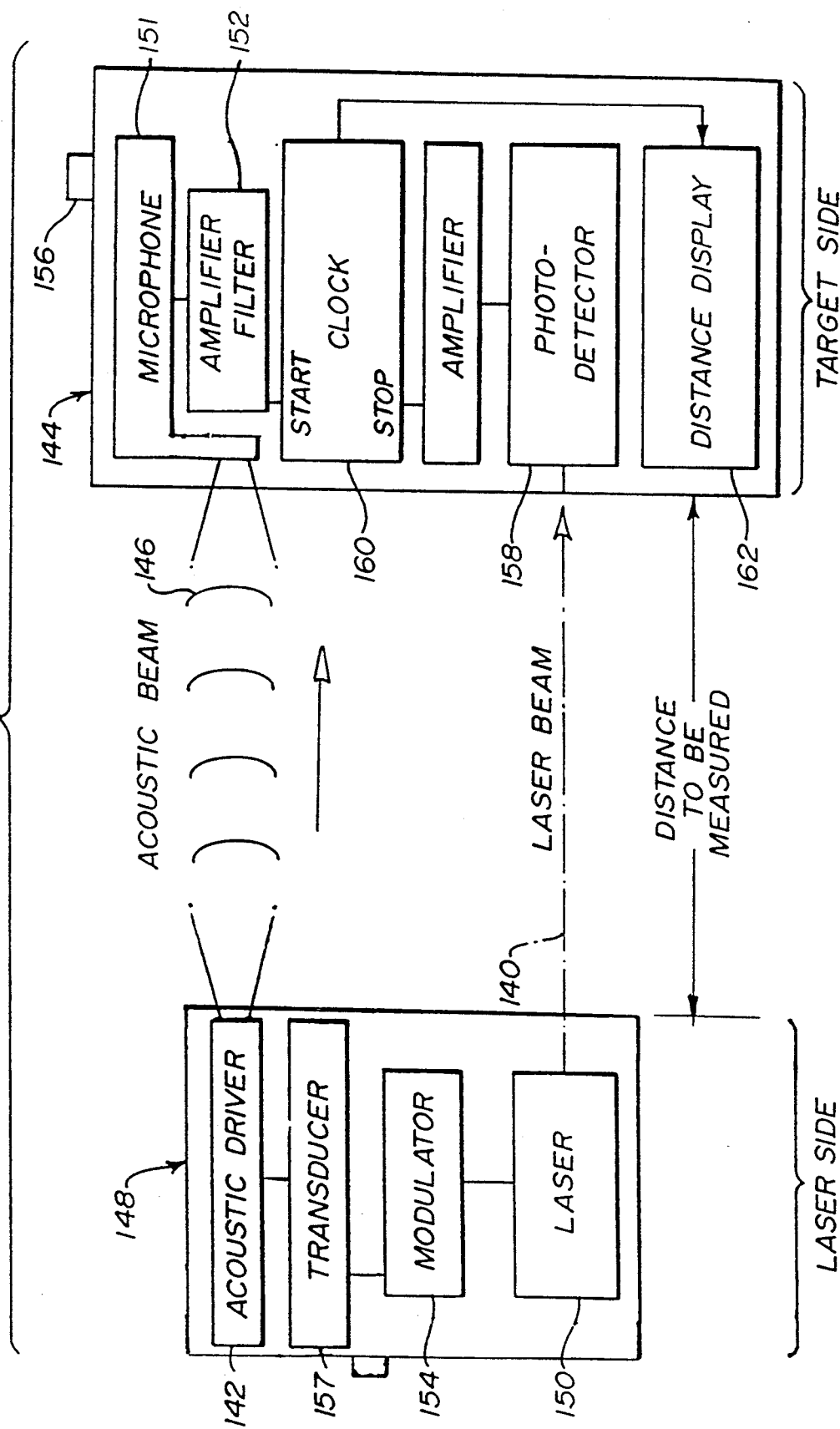

AUTOMATIC PLUMB AND LEVEL TOOL WITH ACOUSTIC MEASURING CAPABILITY

Reference to Related Application

This application is a continuation-in-part of application Ser. No. 714,240, filed Jun. 12, 1991, now U.S. Pat. No. 5,182,863, Issued Feb. 2, 1993, which in turn is a continuation-in-part of application Ser. No. 602,353, filed Oct. 22, 1990, now U.S. Pat. No. 5,075,977, issued Dec. 31, 1991.

BACKGROUND OF THE INVENTION

This invention relates to hand tools, and in particular the invention is concerned with a compact hand tool, generally in the size and shape of a tape measure, for projecting a laser beam for use in relatively precise plumbing and leveling operations. The device has a further use of projecting a pointing beam for use in alignment or layout.

A variety of survey and carpentry tools have previously employed lasers. For example, see U.S. Pat. Nos. 3,897,637, 3,771,876, 4,221,483, 4,679,937, 4,781,457, 4,852,265 and 4,912,851.

In U.S. Pat. No. 3,897,637, there is disclosed a level and squaring tool utilizing a helium-neon laser for projecting a beam both vertically and horizontally. The device was not self-leveling and required manual leveling. It was rather large and required connection to an external source of power.

U.S. Pat. No. 3,771,876 was directed to a laser apparatus for producing a plane or conical optical reference surface. The device used a pendulum hanging from a flexible suspending member, with the pendulum containing the light source so as to be self-leveling. A double mirror or prism device was used for reflecting the beam out of the device 90 degrees from the entry angle of the beam from the pendulum. The double mirror (sometimes called a pentaprism) device was fixed in the unit and allowed for changes in the angle of the approach of the light beam from the pendulum.

Rando U.S. Patent No. 4,221,483, assigned to the assignee of the present invention, discloses a laser beam level instrument using the principle of translation of a lens which collimates a laser diode beam in order to compensate for small degrees of tilt in the instrument. The collimating lens is suspended as a pendulum and has the effect of maintaining the collimated beam in a truly vertical position providing self-leveling in a limited range of movement of the instrument.

U.S. Pat. No. 4,679,937, also assigned to the same assignee as the present invention, discloses a self-leveling battery-powered surveying tool. The tool, which is designed to be set up on a tripod, provides a reference for leveling and alignment. The apparatus, which includes a laser diode as a light source for projecting a generally horizontal but non-planar cone of light from a reflecting cone, includes a tilt compensation arrangement relevant to the present invention. The reflecting cone is suspended by a wire having a controlled stiffness which allows the mirror cone to tip at an angle which is one-half the angle of tilt error of the instrument from true plumb.

A contractor's tool for referencing a chosen elevation at a building site was marketed in the 1970s as Model 840 Building Laser, by the assignee of the present invention. The product also was capable of emitting a vertical beam. It had a helium-neon laser and was powered by an internal battery. The device was not self-leveling.

U.S. Pat. Nos. 4,852,265 and 4,912,851, also commonly owned with the present invention, disclosed level, plumb and alignment tools utilizing a laser diode and having tilt compensation means for small tilt variations from levelness of the housing. The device compensated for tilt in either of two directions of variation from true horizontal of the housing, such as when the tool was placed on a non-level section of floor. It was stated that the device compensated for tilt errors of up to about five degrees, while still projecting a beam from the tool in substantially true vertical or substantially true horizontal orientation.

In order to achieve the ability to project either a truly vertical or horizontal beam, the level/plumb tool of the latter two patents utilized a single pendulum-type tilt compensator in a preferred embodiment, with switching of the output beam's orientation achieved by rotating a dial wheel through 90°. The rotation of the dial wheel moved a two-mirror right angle deflector onto the path of a tilt-compensated vertical beam, deflecting it to horizontal. The housing itself, which in a preferred embodiment was somewhat like a level in shape, remained in the same orientation for both horizontal projection and vertical projection.

While the latter two patents referenced above disclosed an effective level, plumb and alignment tool, none of the previous devices was as compact, as versatile in operation, as easily transported and as rugged as the plumb, level and pointing beam device of the present invention as described below.

SUMMARY OF THE INVENTION

The present invention achieves these objectives in a small, compact tool which may be about the size, shape and feel of a tape measure. The tool is simpler in operation than those described above, in having a single beam exit window in a preferred embodiment. An internal tilt compensation means is effective to achieve substantially true vertical orientation of the emerging beam when the housing rests on one side or edge, and substantially true horizontal beam orientation when the housing is moved to rest on another side or edge which is at right angles to the first. In a preferred embodiment, two different tilt compensation devices are included inside the housing, a first for correcting for tilt when a vertical beam is to be projected and a second for correcting for tilt when a horizontal beam is to be projected.

The two tilt compensation devices may comprise a weighted pendulum with an obliquely mounted mirror, for one orientation of the tool, and a weighted cantilever device having a second obliquely mounted mirror for a 90° rotated position. The second mirror interrupts the path of the beam in this second position and compensates for tilt.

Further, the tool preferably includes means for fixing the position of the laser beam when the tool housing is rested on a third side, which may be a broader, larger flat surface of the housing, so that the beam becomes immobile relative to the tool housing without any tilt compensation. In this mode, the tool is useful in projecting a beam for pointing or alignment purposes.

Any of a number of types of compensation means can be used in the tool, but the compensation means employed most preferably are those which are simple, easily calibrated, reliable and providing a projected light beam whose apparent origin is as close as possible to the bottom of the unit's housing, for minimization of parallax error.

In one specific embodiment of the invention, the compensation means comprise a weighted pendulum device for tilt compensation of the vertically projected beam; and a weighted cantilever device for compensation of the horizontally projected beam. In one embodiment of a vertical compensator, the pendulum-type tilt compensation device is a two-axis pendulum which effects tilt compensation under the influence of gravity for a first degree of mirror movement compensation generally within a plane including the beam incident and reflected from the mirror; and for effecting a second, different degree of mirror movement compensation in a generally transverse plane. This achieves accurate compensation to true vertical beam orientation, regardless of the direction (or combination of directions) in which the tool is tilted. The pendulum device, which may comprise a wire or rod of heavier dimension in one direction than the other, corrects for tilt of the instrument essentially by permitting the mirror surface to change angle orientation by about 0.38 of the amount of tilt to which the unit is subjected. The compensation considerations are slightly different for tilt in the plane of the beam's incident and reflected from the mirror versus tilt in a transverse plane. In the transverse plane slightly more mirror tilt correction is needed, since the laser diode beam approaches the mirror from an oblique angle.

In another embodiment a simple, symmetrical cross section round wire or rod is used for vertical compensation. The resulting transverse tile compensation error is almost insignificant at short range.

Although the preferred embodiments of the invention as described herein are believed to achieve the objectives of efficiency in construction and use, as well as ruggedness, dependability and compactness, other types of tilt compensation can be employed. Other methods and devices for producing a plumb beam include a pendulous lens as in U.S. Pat. No. 4,221,483; a pendulous laser assembly as in U.S. Pat. No. 3,771,876; a pendulous prism as in U.S. Pat. No. 4,781,457; and a pendulous window as in German Patent No. 2,944,408. These systems are believed generally more costly, but could be made to work with a horizontal compensator which intercepts the beam before the beam arrives at the vertical compensator.

An important objective achieved by the present invention is simplicity in use of a level, plumb and pointing device. Instead of rotating a mechanical dial on the exterior of the device as described in the referenced U.S. Pat. Nos. 4,852,265 and 4,912,851, the compact, tape measure-sized tool is simply placed on a surface with the beam exit window either in vertical orientation or in horizontal orientation. Tilt compensation, as well as selection of the proper tilt compensator (for vertical or horizontal) is achieved automatically by the particular compensation means employed.

Further, as noted above, when the device is to be used for a fixed generally horizontal pointing beam or reference beam, it is simply laid on a third side, i.e. a larger flat side (it can be laid on either broad side in a preferred embodiment). This fixes the position of a tilt compensator relative to the laser beam, and stabilizes the beam with respect to the tool housing.

Accordingly, in one preferred embodiment a portable laser beam projecting device for indicating level, plumb and alignment in accordance with the invention includes a hand-carryable housing having at least two sides capable of resting stably on a flat surface, with the two sides being substantially perpendicular to each other. These are preferably two of the narrower edges of the housing. A laser means is mounted within the housing, for producing at least one collimated beam of visible laser light. A beam exit window is positioned in the housing for outward projection of the beam. Beam directing means in the housing are effective to direct a beam from the laser source means vertically out of the housing through the exit window when a first side of said two sides is held generally horizontal, and for directing a beam from the laser source means horizontally out of the housing through the exit window when a second side of said two sides is held generally horizontal. Tilt compensation means in the housing, and associated with the beam directing means, correct for relatively small tilt angles of the housing as it rests with one of the two sides against surfaces not truly horizontal or not truly vertical. The tilt compensation means project the beam through the exit window in substantially true vertical orientation or substantially true horizontal orientation despite such relatively small tilt angles.

In one specific embodiment, the laser source means may comprise two separate laser diodes, one for vertical beam projection and one for horizontal. Thus a diode/lens assembly is provided for each tilt compensator. An appropriate form of switch is included, to activate either the horizontal diode beam or the vertical diode beam (or two beams can be projected simultaneously if desired). In a preferred embodiment of such a two-diode device, the housing still includes only one exit window, and a mercury switch can be used to select between the two diodes. When the housing is moved to a position for vertical beam projection, a first diode is switched on and is tilt-compensated using a first tilt compensation device. When the housing is moved to a position for horizontal beam projection, the second diode is energized to project a different beam, reflecting off a different tilt compensator effective to correct for tilt in this second orientation.

Alternatively, a two-laser diode/two lens embodiment of the invention can have the two diodes themselves tilt compensated, rather than using tilt compensation mirrors.

An additional important feature of the invention is damping of the movement of tilt compensators, so as to stabilize the projected beam in the substantially true vertical or true horizontal orientation as quickly as possible after the housing is set in position. This may be achieved by liquid damping, wherein two different tilt compensators, one for vertical and one for horizontal, are encased in a liquid. The laser diode beam enters the liquid and is reflected from one of the two compensators inside the liquid, being redirected toward the exit window. Indices of refraction of the damping liquid and of any glass interface through which the beam passes are taken into account in this type of damping.

As alternatives, the device can employ air damping or magnetic damping, as described in the above referenced U.S. Pat. Nos. 4,852,265 and 4,912,851. The disclosures of those patents are incorporated herein by reference.

It is therefore a primary object of the present invention to provide a simple, very compact and easily used hand tool for projecting a plumb or horizontal laser beam, or a pointing laser beam, with substantially true vertical and horizontal orientations achieved regardless of relatively small tilt angles of the housing as it is held or as it rests on a non-horizontal surface. A principal purpose of the invention is to provide such a tool which employs gravity to switch from one type of compensation to the other, as the housing is reoriented from vertical projection to horizontal, or vice versa. Further, gravity may be used to switch from either of the compensated vertical or horizontal laser beams to a fixed pointer beam, by de-activating the tilt compensators and fixing at least one of them when the housing is laid on a third side. These and other objects, advantages and features of the invention will be apparent from the following description of preferred embodiments, considered along with the accompanying drawings.

BRIEF DESCRIPTION OF THE DRAWINGS

FIGS. 13A, 13B, 13C and 13D are companion perspective views illustrating another embodiment of the invention, wherein a tape measure is included as part of the tool.

FIGS. 14 and 15 are perspective views showing further embodiments of the invention, wherein a tape measure is integrated with the level/plumb indicator.

FIG. 20 is a schematic drawing in block diagram form, showing a more preferred device according to the invention wherein an acoustic measuring device includes a laser or other light source for triggering a time clock to read a distance via an acoustic signal.

DESCRIPTION OF PREFERRED EMBODIMENTS

Figure 1:
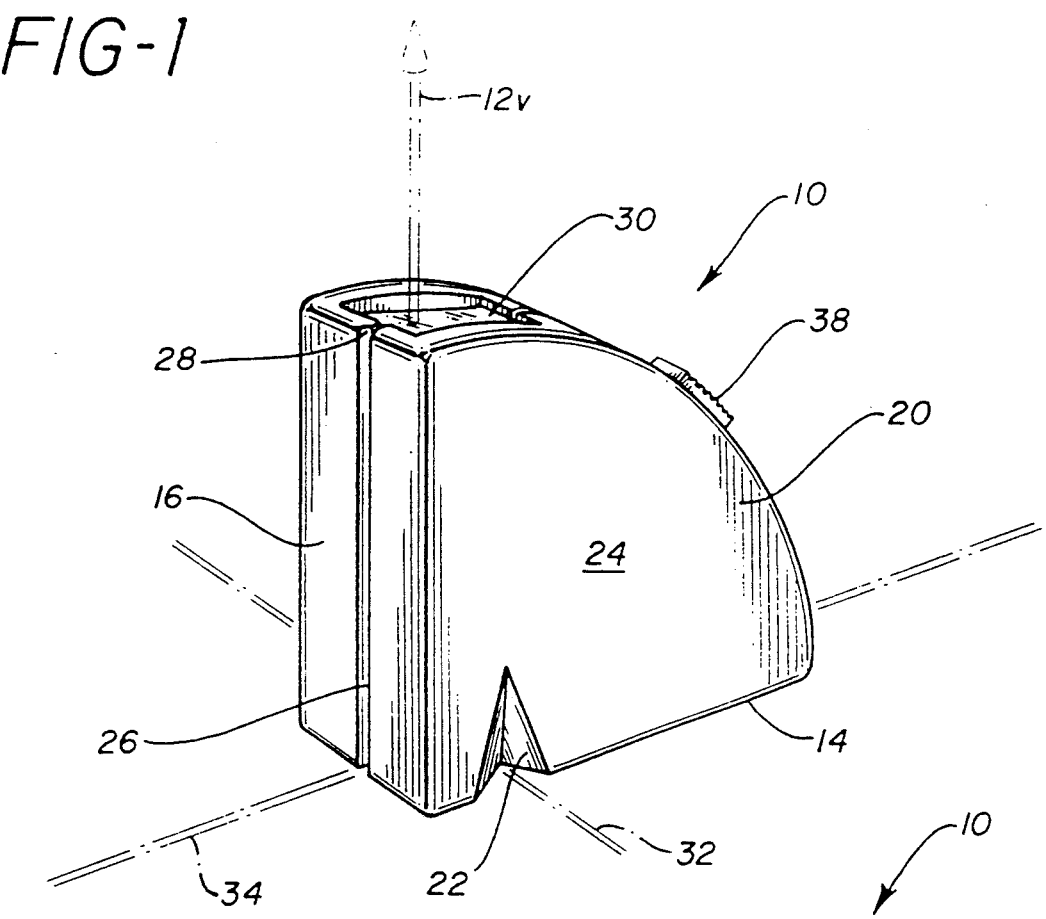
FIG. 1 is a perspective view showing a plumb, level and pointing tool in accordance with the invention, with the device used to project a beam vertically.
Figure 2:
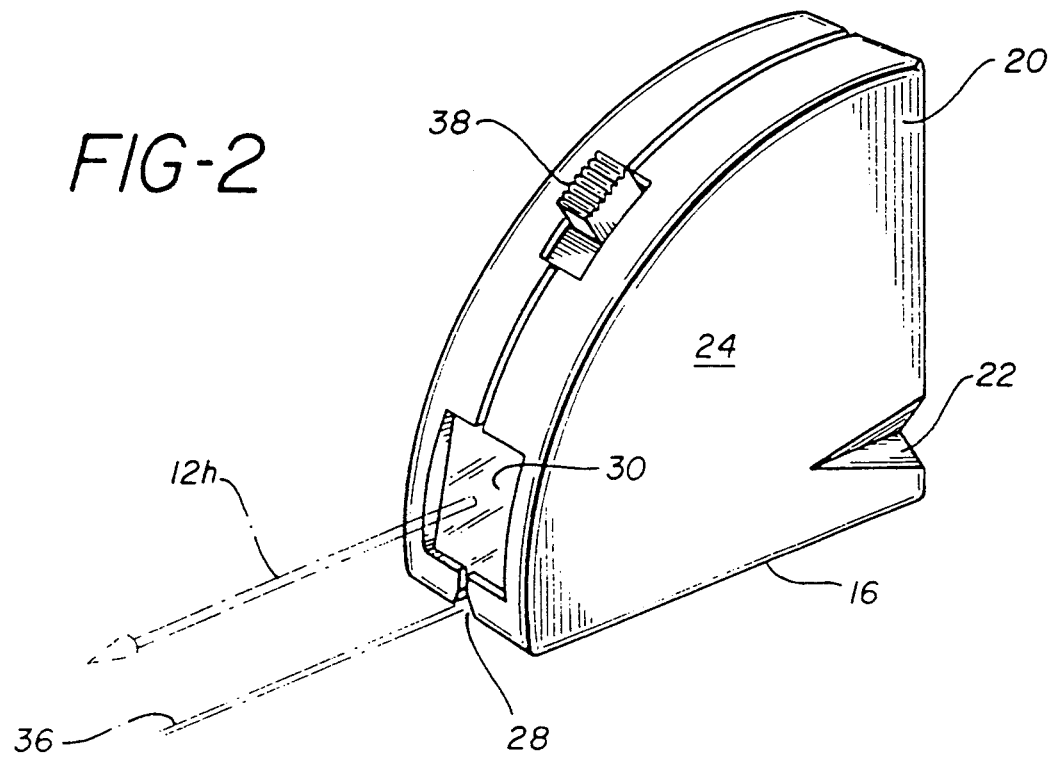
FIG. 2 is a similar perspective view, showing the tool of the invention used in another mode, with the device used to project a horizontal beam.
Figure 3:
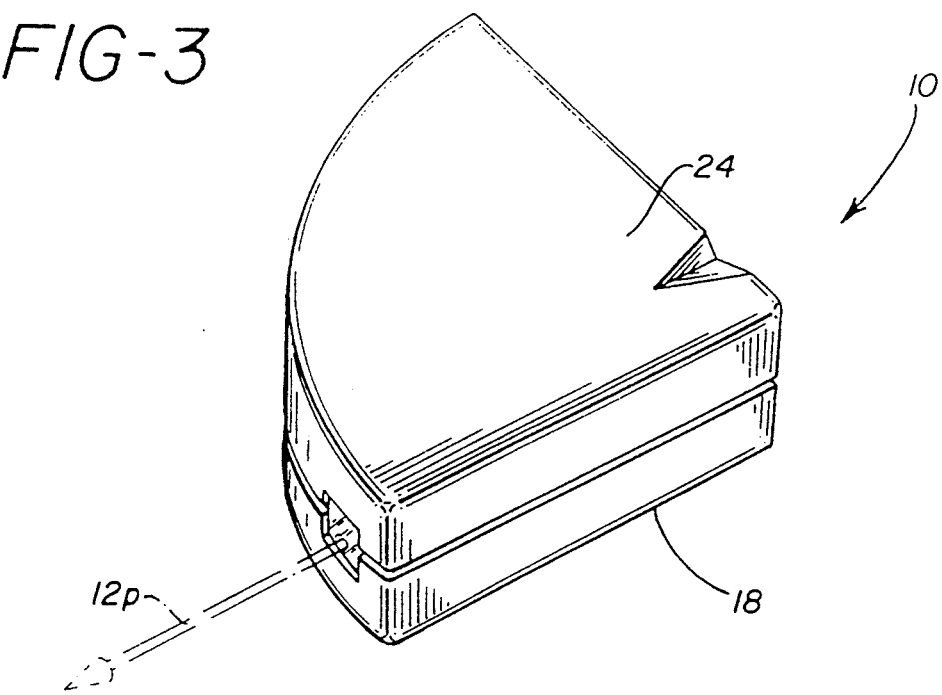
FIG. 3 is a further perspective view, showing the tool used in a further mode, to project a pointing beam.

In the drawings, FIGS. 1, 2 and 3 show a plumb, level and alignment tool 10 as used in successive positions of projecting a vertical plumb laser beam 12v when resting on a first side or edge 14 (FIG. 1), a horizontal beam 12h when resting on a second side or edge 16 (FIG. 2), and a generally horizontal pointing beam 12p when resting on another side, i.e. a broad, flat side 18 (FIG. 3).

The tool 10 has a housing 20 which is generally in the shape and size of a tape measure (e.g. a 25-foot pocket tape measure). It preferably has a length or height along each of the edge surfaces 14 and 16 of about 4 inches or less, and more preferably less than $3\frac{3}{4}$ inches. The thickness of the tool housing preferably is less than about 2 inches, and in a preferred embodiment may be less than $1\frac{1}{4}$ inches.

The sides or edge surfaces 14 and 16 must be capable of resting stably on a horizontal surface (or against a vertical surface). To this end, they preferably are flat as shown, and at right angles to each other. However, these edges may instead be provided with embossings or feet to achieve stability on a surface, so long as some straight line visual indication is provided for the user, for giving the user a general alignment indication for the tool.

FIGS. 1 and 2 show the inclusion on the housing of a notch 22 at the edge 14 and formed in a large flat side 24 of the housing; a line or notch 26 in the side edge 16; and a notch 28 centrally disposed at the side edge 16 and adjacent to a beam exit window 30. These visual indicators, which can take any of a variety of forms, are provided to align the tool 10 with reference lines or marks 32, 34 or 36 as seen in the drawings. The visual alignment indicators give a reference for the projected laser beam 12v or 12h, as illustrated. As seen and explained further below, the tool 10 is provided with tilt compensation along two axes, particularly for the vertical beam projection mode shown in FIG. 1, and the apparent source of the beam is controlled to remain as close to the housing reference marks as possible. This is to reduce sine error when the tool is at a significant tilt.

An external power switch 38 may be positioned on the outside of the housing 20 as shown.

Figure 4:
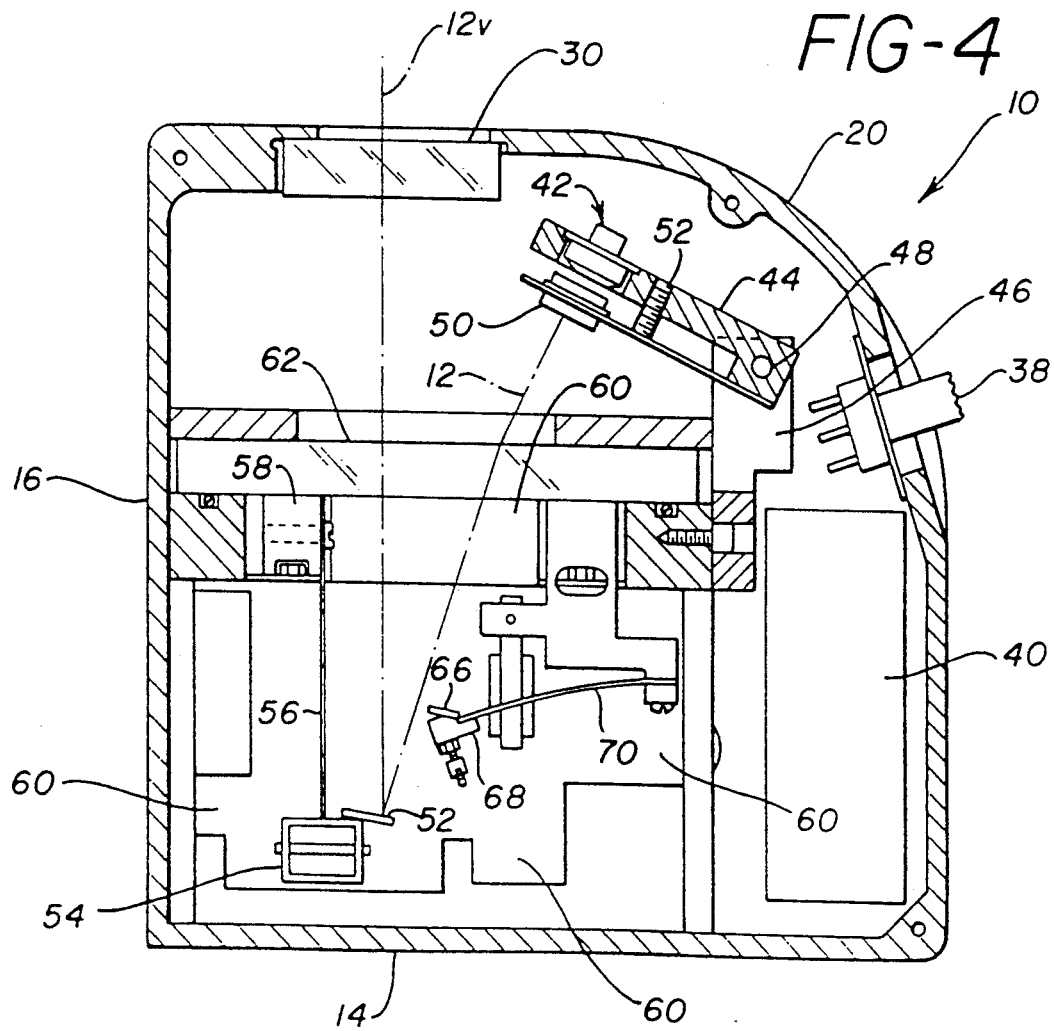
FIG. 4 is an elevation view in section, showing the construction of the tool in one preferred embodiment, with a first tilt compensation for vertical beam projection and a second tilt compensation (inactive) for horizontal beam projection. The tool is shown in position for use as a plumbing or vertical alignment tool, as in FIG. 1.

FIG. 4 shows the internal construction of the plumb, level and pointing tool 10 in one specific and preferred embodiment. The on/off switch 38, which may be a microslide switch as shown, is connected to a battery 40 (e.g. a 9 volt battery) and to a visible laser diode 42 mounted inside the housing. The diode mount 44 may be connected to stable structure 46 in the housing by a tightened pivot mounting 48. A collimating (preferably temperature compensated) lens 50 can be precision adjusted in its distance from the diode 42 via a set screw 51 in this preferred embodiment.

Principal features of the invention, in this preferred embodiment, are that the tool has a single beam exit window 30; that the user simply selects a side edge 14 or 16 in order to choose between a vertically projected beam 12v and a horizontally projected beam 12h (FIG. 5); and that the projected beam be compensated for tilt of the tool housing, still projecting a beam which is substantially true vertical or true horizontal, whether the tool is held with the edge 14 generally horizontal or the edge 16 generally horizontal. This may be achieved in various ways, as mentioned above. This preferred embodiment involves the relatively straightforward use of two alternate reflective surfaces for tilt compensation—one of which is operative when the beam is projected vertically, and the other of which is operable when the beam is projected horizontally.

FIG. 4 shows that a first reflector comprises a mirror 52 which is fixedly mounted on a pendulum weight 54, for vertical beam tilt correction. The pendulum weight is supported on a pendulum shaft or wire 56, supported from a fixed position (pendulum mount) 58 in the housing. It has been found that in this vertical beam tilt compensation, the vertical correction can be quite accurate with a simple round rod or wire 56 is used as the pendulum shaft, with a symmetrical cross section. As explained in U.S. Pat. Nos. 4,852,265 and 4,912,851 incorporated by reference herein, for complete accuracy there must be a different degree of tilt compensation for tilt along one axis as compared to tilt along the other axis, since the beam 12 from the diode/lens assembly approaches the compensation mirror 52 from an angle. However, it has been found that if the pendulum rod 56 is of simple cross section and it is designed properly for tilt correction in the plane of the incident and reflected laser beam (i.e. tilt within the plane of the paper in FIG. 4), tilt angles of the housing in the orthogonal direction (in and out of the page in FIG. 4) are still well within acceptable accuracy. For example, such a tilt of about 3° would produce an error of only about 0.25 inch at 100 feet above the tool.

However, for ideal compensation for tilt with components in either or both directions, the rod 56 may be made with an oblong, elliptical or rectangular cross section, for greater stiffness in the one direction than in the other. The principles of such correction are explored and fully discussed in the patents incorporated by reference.

In the preferred embodiment illustrated, damping of the motion of the pendulum weight 54 and mirror 52 following placement of the tool is achieved by liquid damping, although other suitable forms of damping may be used. Thus, the housing includes a liquid such as a clear oil within a liquid enclosure space indicated at 60 in the drawing. The laser beam 12 is shown passing through a glass (or other transparent material) sealing plate 62 which acts as an interface between the liquid space 60 and the air space above. The beam 12 then passes down through the damping liquid to the first tilt compensating mirror 52. As shown in FIG. 4, refraction occurs as the beam passes through the glass sealing plate 62 and again as the beam enters the damping liquid. The degree of this refraction depends on the index of refraction of the plate 62 and of the oil or other liquid. However, it is a fixed relationship, until the beam is reflected by a compensating mirror, and thus is a constant.

It should be understood that virtually the whole interior of the housing, or the interior up to the exit window and to a point near the lens 50, can be filled with liquid if desired.

Although FIG. 4 shows the compensated vertical beam 12v exiting the liquid damping bath substantially at right angles to the plate 62, this will change with increasing tilt angles, and this effect is taken into account. As will be seen later, and as illustrated in principle in FIG. 12, the change in index of refraction multiplies the effect of position adjustment in the compensating mirrors.

As an example in this preferred embodiment, if the tool 10 were to be tilted at an angle of 2.8° within the plane of the incident and reflected laser beam (i.e. within the plane of the paper in FIG. 4), a similar total correction of 2.8° must be made for the emerging plumb beam 12v as compared to the orientation of the housing. In one preferred embodiment the pendulous mirror 52 and its connected structure will be set to tip one degree to make the correction. This correction is doubled to two degrees by the incidence and reflection of the beam on the mirror 52. In addition, for a clear mineral oil damping bath with an index of refraction N of 1.4, this will increase the correction to $1.4 \times 2° = 2.8°$, as the beam exits the liquid bath toward the exit window 30, entering the air. The effect of the beam's passing through the transparent plate 62 at a slight angle is negligible in this situation.

Figure 12:
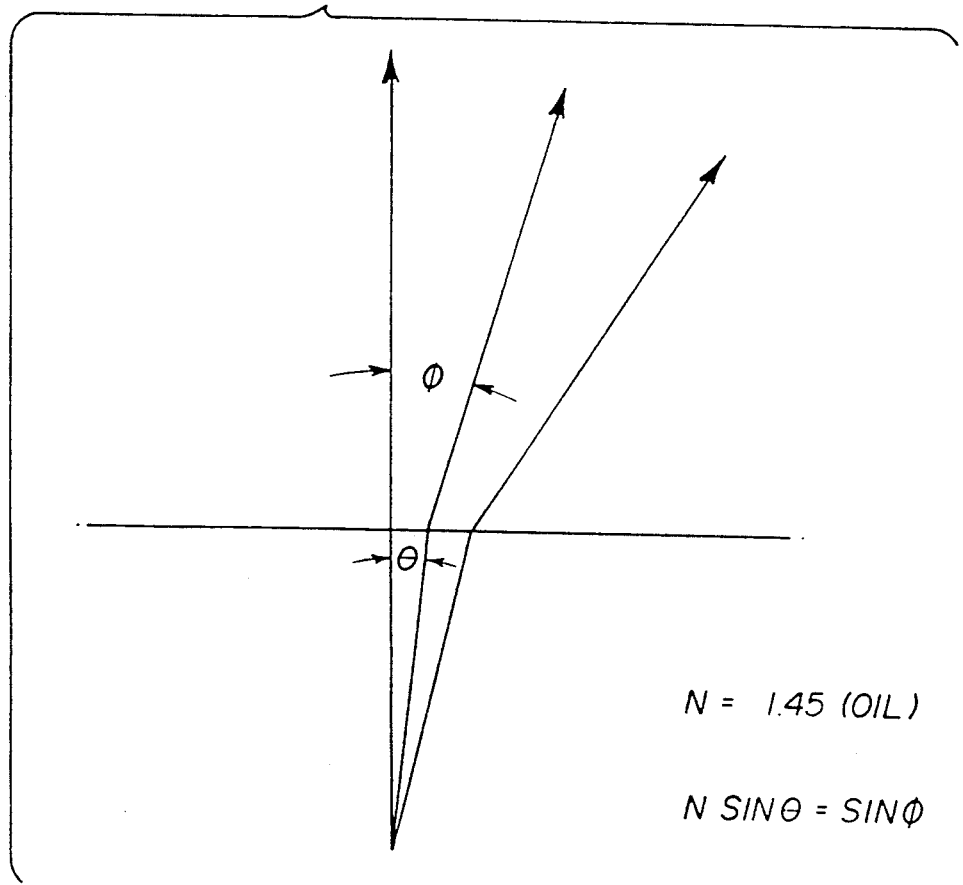
FIG. 12 is a schematic view showing the effect of different angles of emergence from a liquid damping medium of the tool.

FIG. 12 illustrates the relationship used in the equation above.

An increase in the viscosity of the oil or other liquid in the liquid damping will increase the motion damping effect of the liquid, but at the same time this can cause the device to compensate for tilt more slowly. At the same time, an increase in viscosity generally corresponds to an increase in index of refraction, which will increase the beam emergence angle and thus require that the mirror 52 make a lower angle of deflection for a given tilt, for accurate compensation. These are important considerations in the selection of the damping liquid to be used in the tool 10.

Figure 7:
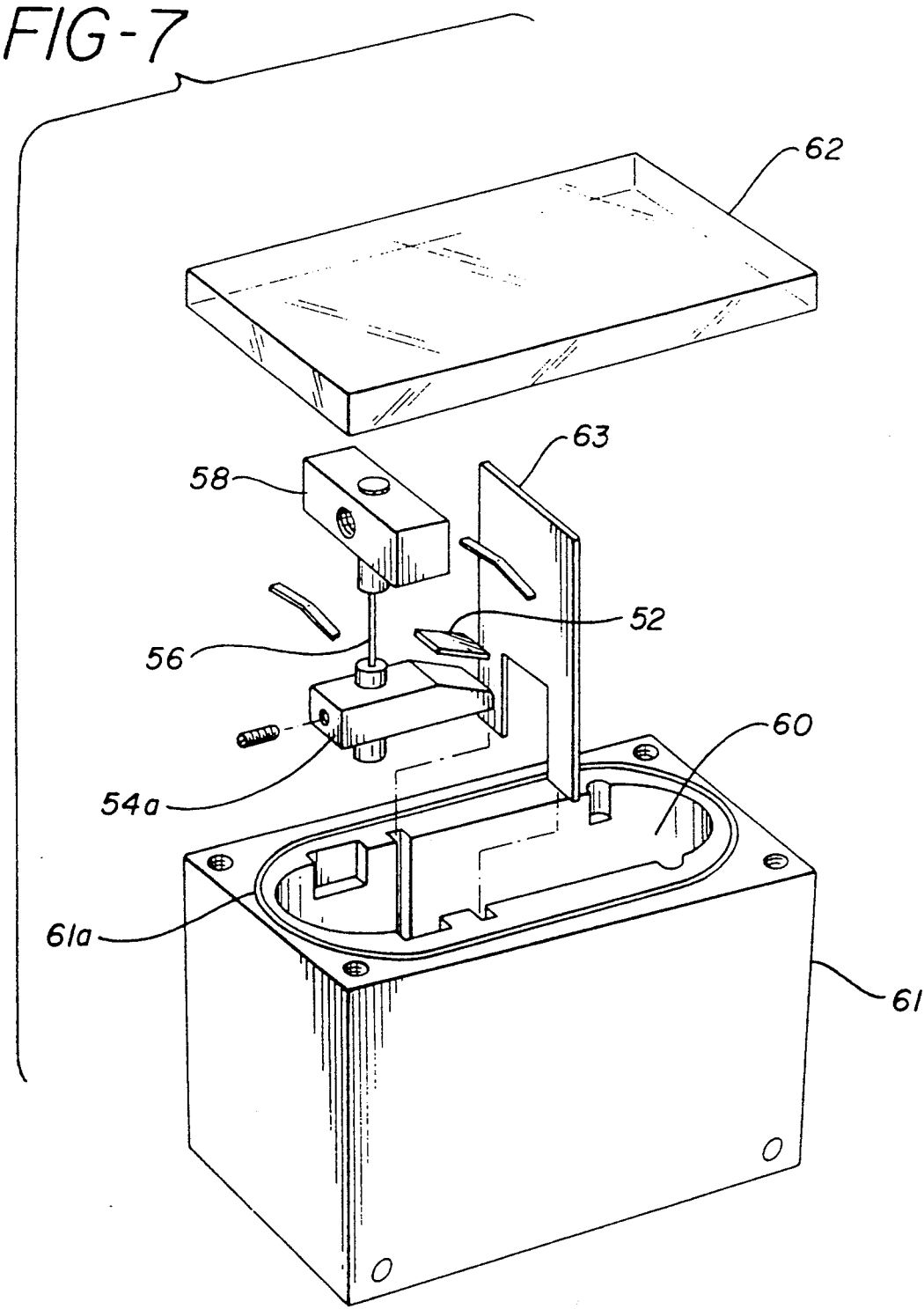
FIG. 7 is an exploded perspective view showing a preferred embodiment of a vertical plumb compensator in accordance with the invention.

FIG. 7 shows in exploded view some of the principal components of the vertical tilt compensation arrangement described with reference to FIG. 4. As illustrated, the liquid damping bath may be contained in a tank 61 such as of plastic. The tank 61, which is completely filled with liquid, may be sealed against the transparent plate 62 by an O-ring 61a, also seen in FIG. 4. A preferred feature of the tilt compensator is the inclusion of a caging device 63 for the pendulum's mirror support 54a (shown in somewhat different configuration from what is shown in FIG. 4). The caging device 63 may comprise a notched plate as shown, positioned to straddle the pendulum weight or mirror support 54a in the assembled tool. The pendulum is straddled with sufficient clearance that it can operate to adequately compensate for tilt in both orthogonal directions discussed above. When the tool is laid on its side or carried at a steeply oblique angle, the caging device 63 engages one of the edges of the pendulum device 54a and essentially immobilizes it, thereby protecting it against damage and excessive movement which might bring about eventual maladjustment.

Another important effect of the index of refraction of the liquid is in the fixed portion of the beam's path as it leaves the diode/lens assembly 42, 50. The greater the index of refraction of the liquid, the more the laser beam will be bent as it enters the liquid, and thus the closer to vertical the beam can be in the liquid, for a given offset position of the diode/lens. This lessens the incidence/reflection angle from the first tilt compensation mirror 52, therefore permitting the mirror 52 to lie closer to horizontal. In turn, this will make tilt correction in the plane perpendicular to the plane of the light beam (i.e. in and out of the paper in FIG. 4) more accurate, assuming use of a symmetrically cross sectioned pendulous support 56. In other words, ideal correction for tilt in the plane and transverse directions comes more closely to requiring the same type of correction. (If the source of the beam could be from directly above the mirror 52, the tilt correction problem would be essentially identical in both directions).

In a preferred embodiment of the invention, the mirror 52 is at an inclination of about 17° off normal from the compensated vertical beam 12v. Thus, as fully discussed in U.S. Pat. No. 4,912,851, for ideal correction the stiffness of the pendulum rod 56 acting in the plane of the beam and of the paper in FIG. 4 would have to be somewhat greater than in the other direction.

The use of a liquid damping bath, preferably fairly viscous, has other important advantages. The refraction effect allows a stiffer design of the tilt compensation devices. This, along with the fact that the liquid bath protects the movable members somewhat from jarring against the housing, makes the tool far more rugged.

As seen in FIG. 4, a second tilt compensating reflective mirror 66, supported on a weight 68 at the end of a flexure component or cantilever beam 70, is deflected out of the path of the laser beam 12 by the influence of gravity. When the tool 10 rests on the surface 14, or is held with the edge surface 14 generally horizontal, the mirror/cantilever weight assembly 66, 68, 70 is inactive. It is an important feature, in this embodiment of the invention, that the means for switching from the first tilt compensation assembly 52, 54, 56 to the second tilt compensation assembly 66, 68, 70 be responsive to gravity, rather than requiring any mechanical switching, lever adjustment, etc. by the user.

Figure 5:
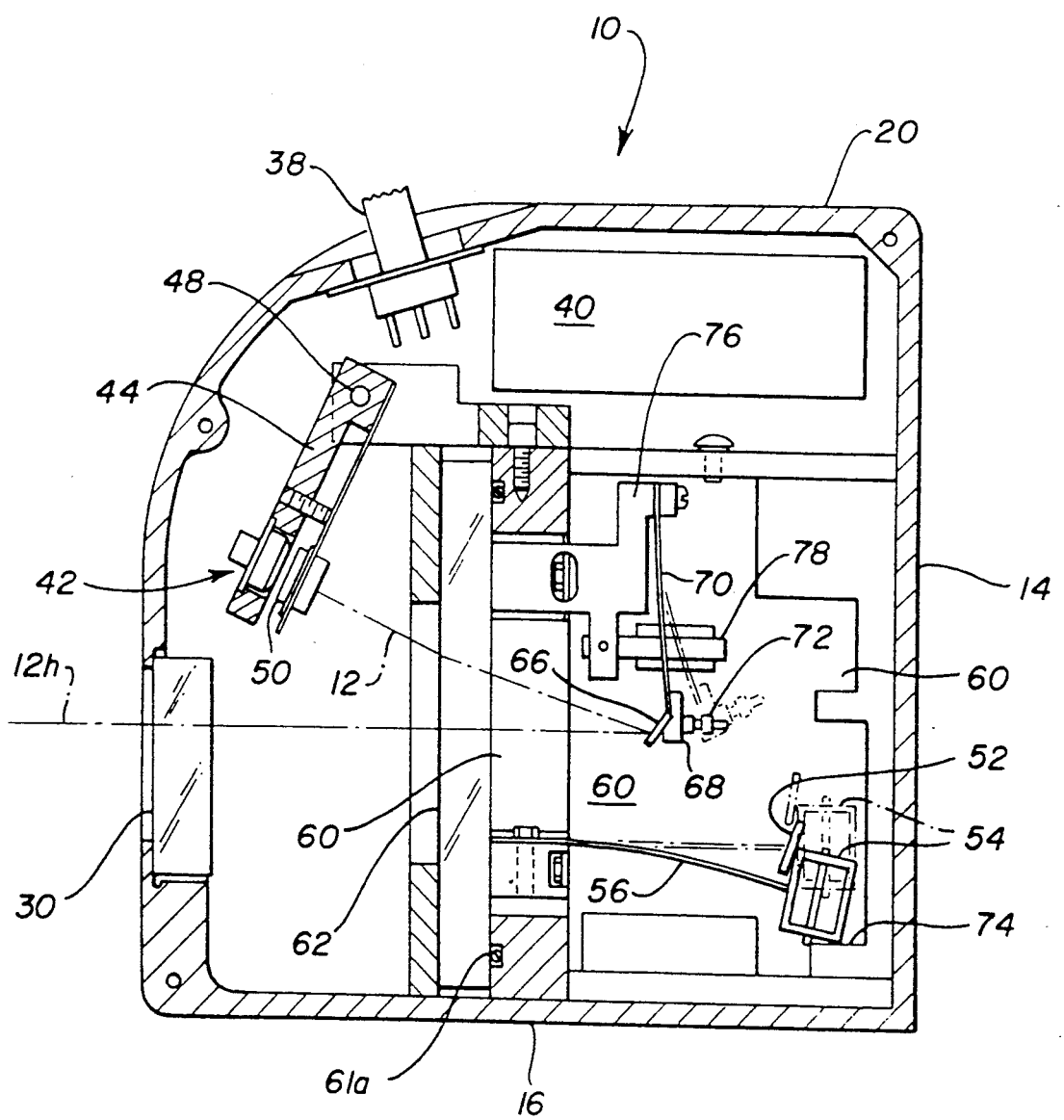
FIG. 5 is an elevational section view similar to FIG. 4, but showing the tool in a 90°-rotated position, for use in projecting a tilt-compensated horizontal beam, as in FIG. 2.

FIG. 5 shows the tool 10 after it has been moved to a position wherein the side or edge surface 16 is generally horizontal. The horizontal beam tilt compensator assembly is also detailed in FIGS. 8, 9, 10 and 11, and those drawings should also be referred to, regarding the following discussion.

In FIG. 5 the tool 10 is used to project a tilt-compensated horizontal laser beam 12h. Due to the influence of gravity, the cantilever weight 68 of the second compensator has swung the cantilever beam 70 and the second mirror 66 down to a position of being directly in the path of the laser beam 12 from the diode/lens assembly 42, 50. Thus, the second compensation mirror 56 interrupts the beam 12 before it reaches the first, vertical compensation assembly. The resulting corrected horizontal beam 12h is projected out of the beam exit window 30 at a slightly different position from that of the vertical beam 12v in FIG. 4.

As indicated in FIG. 5, the cantilever member 70 of the second compensator may be hanging generally vertically when it is interposed in the path of the beam 12, as shown. However, this is not necessarily the case and the cantilever member 70 could have a "normal" position which is somewhat oblique. A counter weight 72 mounted on the cantilever weight 68 may be adjusted (via threaded connection) in order to calibrate the tool and effect the accurate degree of horizontal tilt compensation.

In this mode of the tool 10, the first, vertical tilt compensation assembly 52, 54, 56 is inactive as shown. The pendulum weight 54 may rest against fixed structure 74 of the housing in this mode. In other positions it may be caged by the caging device 63 discussed above (FIG. 7).

Figure 10:
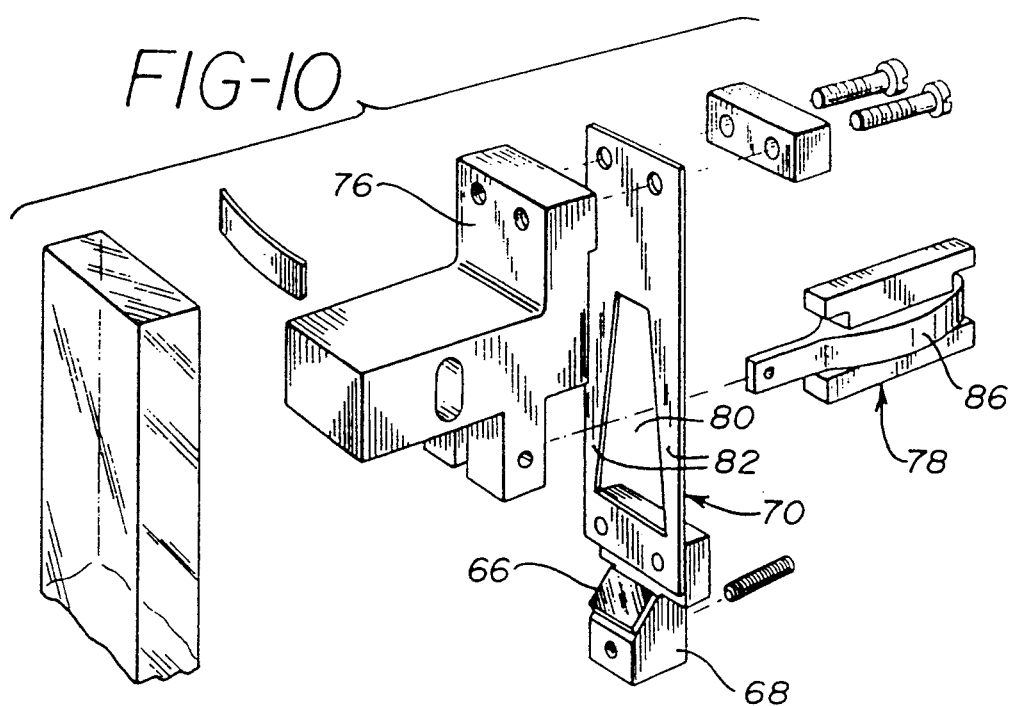
FIG. 10 is an exploded perspective view further illustrating principles of a tilt compensator in accordance with the invention. The figure shows a gravity activated brake for use in the pointing mode as shown in FIG. 3.

As shown in FIGS. 4 and 5, the cantilever beam member 70 of the second compensator is supported on a mounting bracket or other structure 76 connected to the housing. There may also be, as shown in FIGS. 4, 5 and 10, a brake weight 78 connected to the structure 76. As shown in the perspective exploded view of FIG. 10, this brake weight 78 may be positioned in a central opening 80 of the cantilever member or beam 70, its purpose being to immobilize the cantilever beam 70 when the tool is laid on a broad side 18 as shown in FIG. 3 (or on the opposite broad side 24). Thus, when the tool is to be used as a pointing beam for directing a horizontal beam fixed relative to the housing, the brake weight 78 flexes slightly as the tool is placed on either broad side, and lightly engages one of two cantilever beam arms 82, immobilizing the cantilever member 70 and mirror 66 relative to the housing. In the pointing beam mode, the first compensator assembly 52, 54, 56 is out of the path of the beam.

Figure 8:
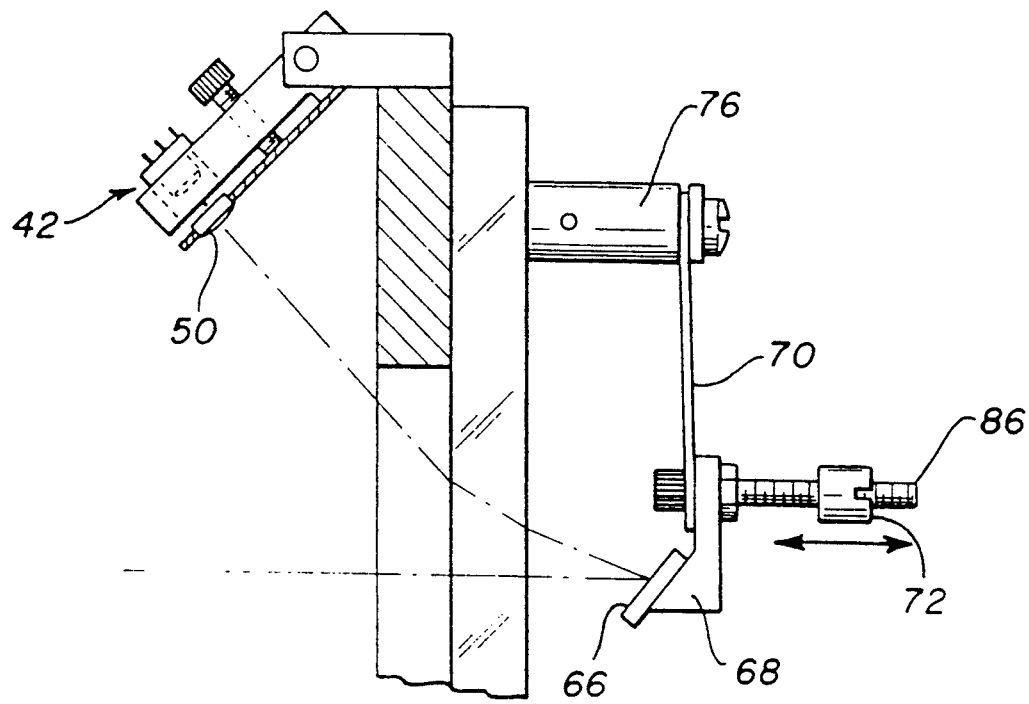
FIG. 8 is a partial elevation view, somewhat diagrammatic, showing the operation of the horizontal tilt compensator in one embodiment of the invention.
Figure 9:
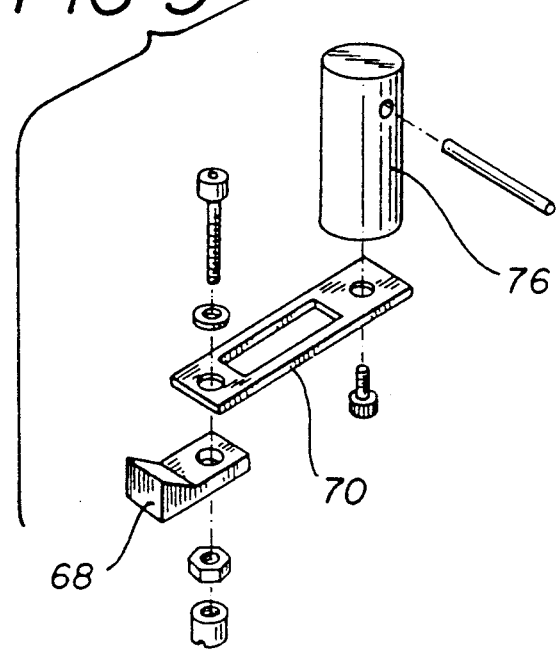
FIG. 9 is an exploded perspective view showing a portion of the horizontal compensator.

FIGS. 8, 9, 10 and 11 show further features of the horizontal tool compensation assembly in a preferred embodiment of the invention. In FIG. 8 the counterweight 72 and its fine calibration adjustment on a threaded rod 86 are indicated. FIG. 9 is a further exploded view showing assembly.

Figure 11:
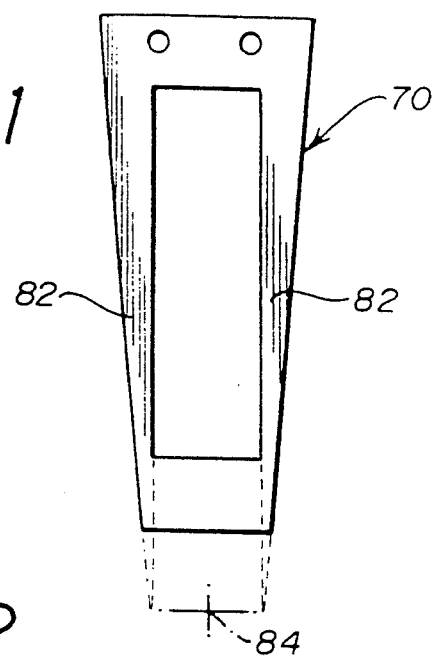
FIG. 11 is a view illustrating one aspect of the apparatus and method illustrated in FIG. 10.

FIGS. 10 and 11 illustrate an important feature of the horizontal compensator which allows for a large range of linearity of force/displacement in the system. That is, the tool is afforded a considerable degree of tilt, while the horizontal beam is still kept substantially truly horizontal. It has been found that the tilt angle of the tool as used in the horizontal mode shown in FIG. 5 can be plus or minus 7°, provided the cantilever beam 70 is designed properly. For a tilt of plus or minus 7°, the device can achieve an accuracy within 20" of arc. (It is noted that the horizontal tilt compensator operates only in a single axis, since tilt rotation of the tool in and out of the paper as seen in FIG. 5, even through an appreciable tilt angle, has virtually no effect on the horizontal accuracy of the beam.)

A preferred structure of the cantilever beam is shown in FIG. 11, which should be viewed along with FIGS. 8, 9, 10 and 5. The cantilever member or beam 70 is formed of two legs 82 which are tapered. These tapered legs become more and more flexible as their cross sections become smaller. If the center of gravity 84 of the cantilever weight 68 is positioned at the point where the two sides of each tapering leg 82 would intersect, the desired linearity of behavior of the beam 70 is achieved. This is because the moment and bending is distributed over the length of the beam instead of being concentrated at one end. The cantilever beam 70 could be a single tapered member, but the bifurcation of the legs 82 is preferred in this embodiment so that the brake weight 78 can be fitted between them. Thus, an encircling rubber member 86 of the brake weight 78 can engage either cantilever leg 82, depending on which way the tool 10 is laid down.

Figure 6:
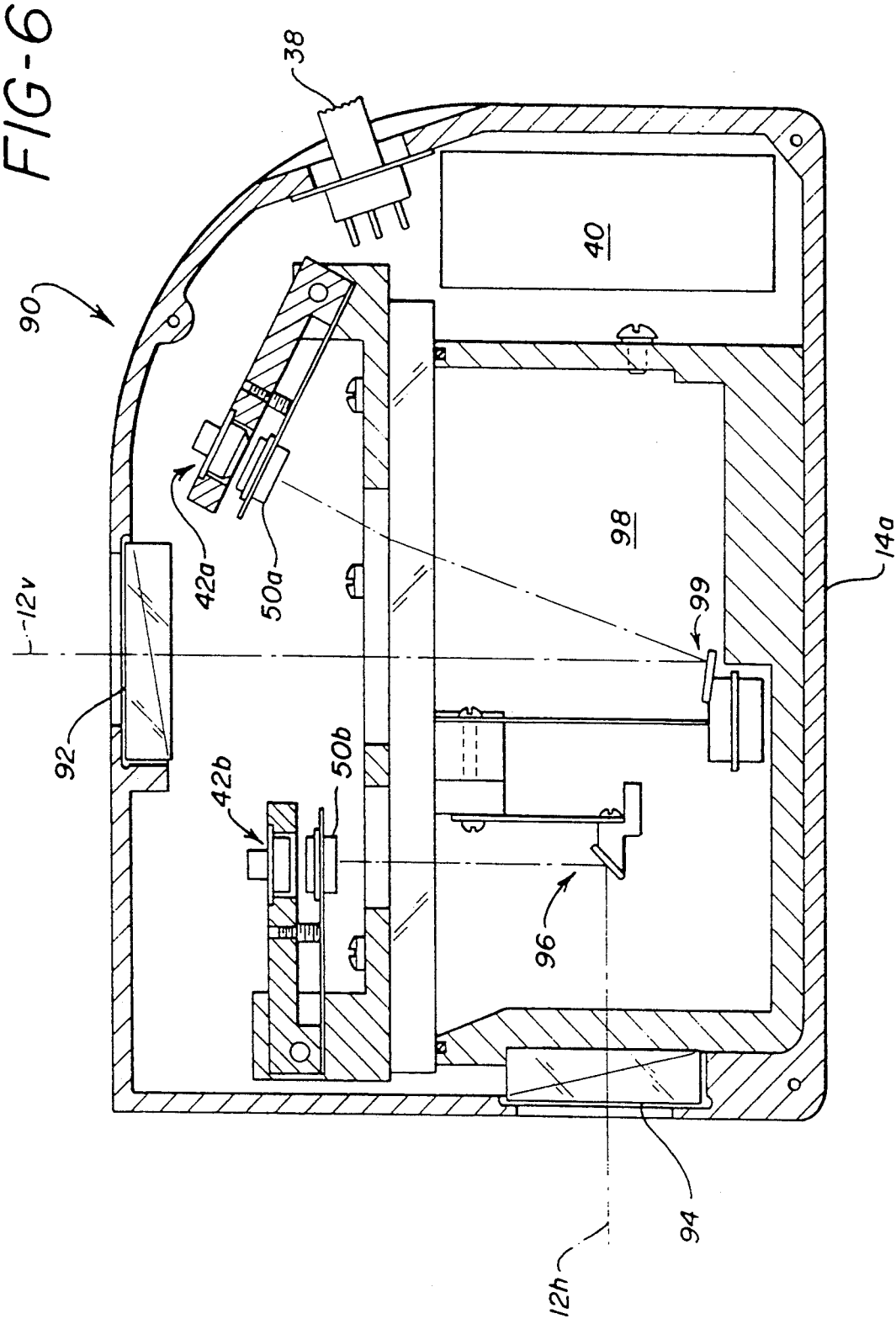
FIG. 6 is a schematic view in elevation showing a two laser/lens embodiment of the invention.

FIG. 6 is a sectional view similar to FIGS. 4 and 5, but showing an embodiment of a laser plumb and level tool 90 having two separate laser diodes/lens assemblies 42a/50a, 42b/50b. The arrangement shown in FIG. 6 is only one example of the way in which such a dual laser source tool can be constructed.

As shown in FIG. 6, in the particular embodiment illustrated separate beam exit windows 92 and 94 are included, and the tool is thus used with a single side 14a generally horizontal, for projection of either of the beams 12v or 12h, or the two beams simultaneously if desired. Alternatively, the tool can be constructed with a single beam exit window, with some of the optics and a second, horizontal tilt compensation assembly 96 essentially mounted at right angles to what is shown. In such a single-window embodiment, the two beams could be projectible through the single window at slightly offset positions from one another. However, one advantage of the construction illustrated is that the two beams 12v and 12h may be projected simultaneously if desired. Appropriate switching, in addition to the illustrated switch 38, can be provided for this purpose.

In the tool 90 shown in FIG. 6, again a single liquid damping bath space 98 can be provided. The structure and function of the second (horizontal) tilt compensation assembly 96, and of a first (vertical) tilt compensation assembly 99, along with many other constructional features, can be similar to what has been described earlier with respect to the tool 10.

In view of the above, it is understood that a device may be constructed in accordance with the present invention which produces a beam 12 which is directed from the housing at any useful predetermined angular orientation other than vertical or horizontal when the housing is in a defined reference position, and that a tilt compensation assembly may be included to maintain the desired angular orientation despite tilting of the housing at relatively small angles from its reference position.

FIGS. 13 through 15 show additional embodiments of the invention, wherein the plumb, level and pointing tool is integrated with a tape measure.

In FIGS. 13A through 13D, a plumb, level and pointing tool 10 such as described above, secured by a pivot connection 100 to a tape measure 102 of typical configuration. Both the tape measure 102 and the laser tool 10 are shown in different positions of rotation and different positions of relative rotation in these four drawings. In FIG. 13A the laser tool 10 projects a tilt-compensated vertical beam 12v which may be used to reference the tool on an overhead beam or on a ceiling mark, for example. Thus, a carpenter, plumber or other tradesman or worker can use the tape 104 to measure a certain horizontal or generally horizontal distance from the overhead mark at which the tool is located. The tool can include markings indicating that the user should add a specified increment, such as ½ inch, to the reading at the front 106 of the tape measure, to be corrected for the distance to the actual reference beam 12v.

FIG. 13B shows the tape measure 102 rotated 90° from the position in FIG. 13A, and indicates that the tape 104 may be used to measure a vertical distance with the tape 104 held truly plumb. The tilt-compensated vertical beam 12v is used as a guide for accurately holding the tape 104 vertically.

In FIG. 13C the laser tool 10 has been rotated to a horizontal position, projecting a tilt-compensated horizontal beam 12h. Thus, the laser beam can be used as a reference marking beam for accurate measurement along a horizontal line using the tape 104.

In FIG. 13D, the tape measure 102 has been rotated to measure vertically, with the laser tool 10 still projecting a horizontal beam 12h. This use of the tool is similar to that of FIG. 13A, in that the laser beam achieves an accurate reference from a distant point, i.e. it locates the tool at a precise level, from which upward (or downward) measurements can be made to a specific point a given distance above (or below) the level of the horizontal beam 12h.

FIGS. 14 and 15 show further variations. In FIG. 14, a tape measure 106 having arm brackets 108 can be snapped onto a modified laser tool 110, via openings in the brackets 108 and snap-like connections 112 on the laser tool 110. As indicated, the beam window can be directly inside the snap connection 112 shown in FIG. 14, so that the tilt compensated vertical beam 12v is projected through this opening.

In FIG. 15 a tape measure 106 similar to that of FIG. 14 can similarly be snapped onto a further modified laser tool 114. On the laser tool 114 are four snap-like connectors 116, two on each opposing pair of narrow tool edges. In this way, the tape measure 106 can be selectively positioned in either of two right-angled positions to provide orientations relative to the laser beam 12 as needed. For example, the laser tool 114 could be used in the vertical beam mode shown in FIG. 15, with the beam 12v located on an overhead point. Measurements could be made in many different radial directions in a point thus located at the center of the tool 114, or a measured arc could be swung from such a point. The tool can be used for similar purposes with the tape measure 106 attached in the 90°-rotated position.

Figure 16:
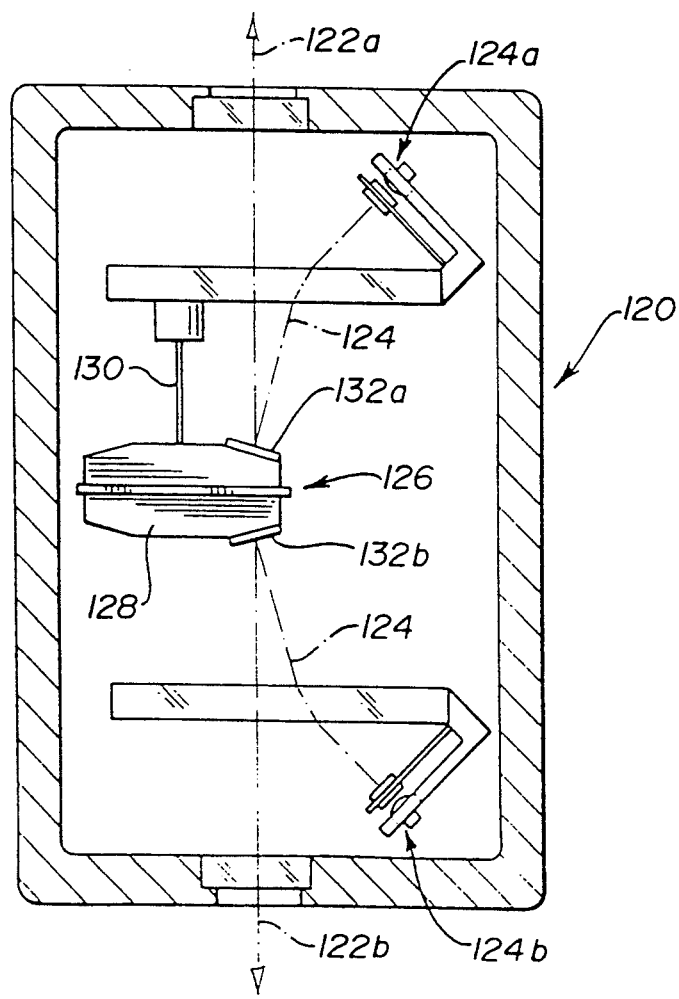
FIG. 16 is a schematic sectional view showing a device for projection of tilt compensated beams in both up and down vertical directions.

FIG. 16 schematically illustrates a variation of the invention wherein a laser tool 120 projects plumb beams 122a and 122b in both up and down directions. As indicated, a pair of diode/lens assemblies 124a and 124b are included, projecting beams 124 in symmetrically opposite directions. The beams 124 can pass into a liquid damping bath as above, and the beams are shown refracted due to such a liquid damping bath although the damping bath is not specifically shown in this schematic view.

In this embodiment of the invention, the single pendulum tilt compensator 126 can be included, with a pendulum weight 128, a pendulum support wire or rod 130 and a pair of compensating mirrors 132a and 132b. It can be seen that, with the manner in which the mirrors are mounted and located (i.e. on the same side left/right of the weight 128), a compensation of the upper beam 122a will effect an equal compensation for the lower beam 122b, keeping them both substantially truly vertical. Such a tool has a number of uses in the fields of carpentry, mechanical contracting, electrical and plumbing. Points can be located above and below a user, lying on the same vertical line. Studs, timbers and walls can be checked for plumb, without requiring the user to bend down to the floor.

It should be understood that the laser tool of the invention can be integrated with other tools. It can be integral with or attached to an acoustic distance measuring device, greatly aiding in accuracy of such a device. The projected laser beam can serve as a pointing beam for the distance measuring device, so that the device can be aimed at a special acoustic reflector which may be placed on a wall whose distance from the device is to be measured. The pointing beam enables an accuracy in directional orientation which would not otherwise be possible, and a small reflective target can be used. Without such a pointing beam, acoustic distance measuring devices have tended to read the distance to a wood wall differently from the distance to a drywall, for example.

Figure 17:
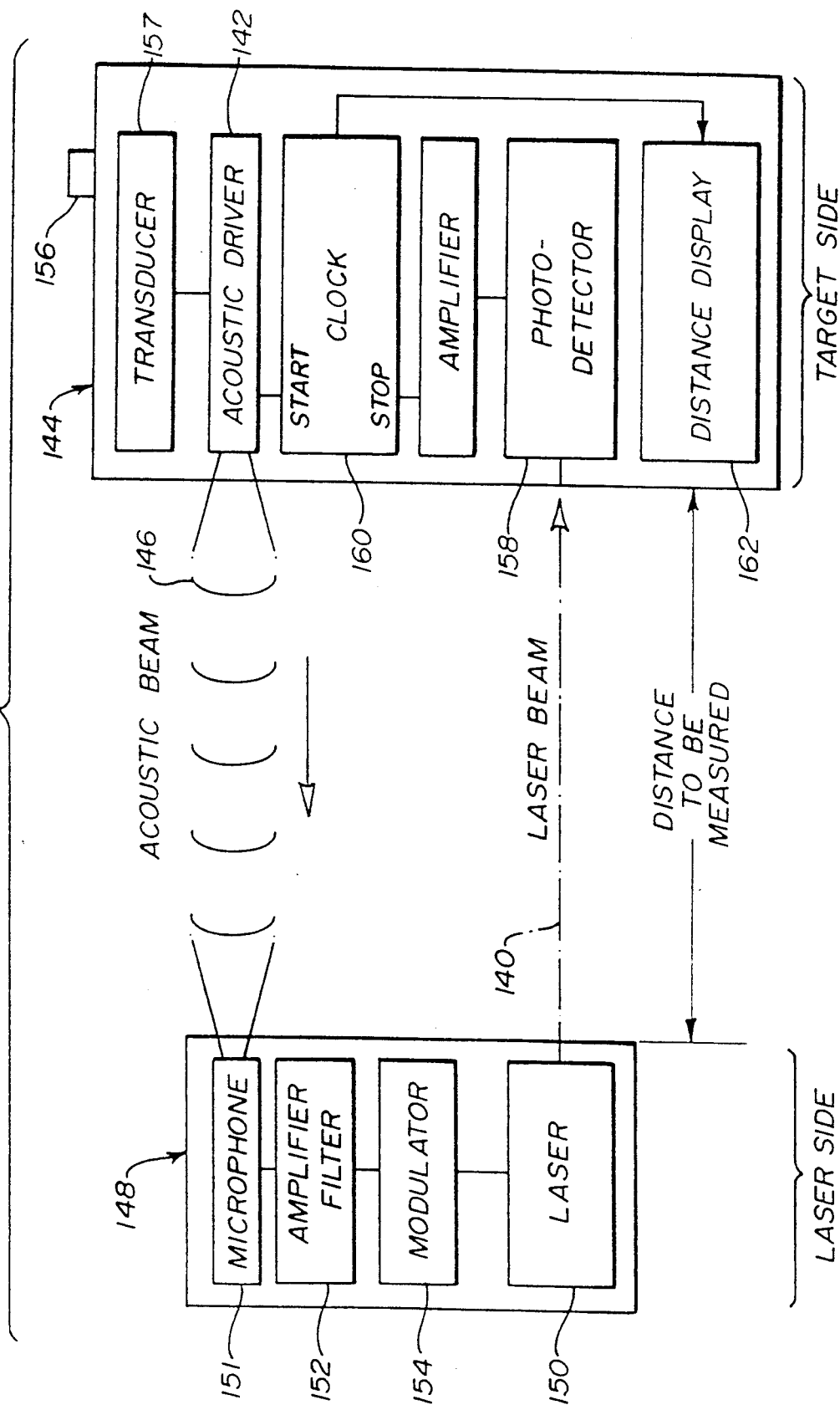
FIG. 17 is a schematic drawing in block diagram form, showing a device according to the invention wherein an acoustic measuring device includes a laser or other light source for triggering a time clock to read a distance via an acoustic signal.

A further embodiment of the above mentioned acoustic distance measuring device is shown in FIG. 17. In this embodiment, which preferably but not necessarily includes the plumb/level device, a light beam 140 is used to communicate the acoustic transit time. In this case the acoustic pulse or wave form generator 142 is built into the target device 144, as shown in the drawing. An acoustic signal indicated at 146 is sent to a housing 148 containing the laser 150 and compensators (not shown). A microphone 151 built into the housing 148 detects the acoustic signal 146 and produces a signal processed by an amplifier/filter 152. The signal goes to a modulator 154, which modulates the outgoing light beam 140 via the drive current with a characteristic light signal, indicating receipt of the acoustic signal. A laser is indicated in the drawing, but virtually any collimated light source which is modulatable can be used.

In the device as described and shown in FIG. 17, the laser side device or housing 148 containing the laser (or other light source) acts as a transponder, being activated by the acoustic beam to emit the modulated, characteristic light signal in response. The laser side device 148 is "on" during the entire procedure, projecting a beam 140 so that the target device 144 can be properly located with the beam aimed at the photodetector 158. The target device 144 is switched on (via a switch 156) when the measurement is to be taken. Repeated measurements preferably are taken (e.g. multiple repetitions per second) as long as the target device is on, and the display will provide a series of readings, changing if the two components 144 and 148 are moved relative to each other.

The target side 144 can, of course, be made to act as a transponder. In that case the characteristic light pulse would initiate the measurement sequence and would trigger the acoustic pulse from the driver 142. A clock 160 and distance display 162 (shown in the target side 144) would then be on the laser side, i.e. in the housing 148, and the calculation of distance would be performed and displayed in the housing 148.

A further and more preferred embodiment of the acoustic distance measuring device is shown in FIG. 20. In this embodiment which, again, preferably but not necessarily, includes the plumb/level device, neither the laser side device nor the target side device 144 acts as a transponder. Both the acoustic signal indicated at 146 and the outgoing light beam 140 are sent from the housing 148 to the target side device 144. The microphone 151 and photodetector 158 are in the target side device 144, and detect the acoustic signal 146 and light beam 140, respectively. A clock 160 and distance display 162 are located in the target side device 144.

In the device as described and shown in FIG. 20, the laser side device is also "on" during the entire procedure, projecting a light beam 140 so that the target device 144 can be properly located with the beam, and projecting an acoustic signal 146. The measurement sequence is initiated by simultaneously triggering modulation of the beam 140 and projection of the acoustic signal 158. The target side device 144 is switched "on" via switch 156 and the measurement is taken.

The described device, system and method of measuring distance use one-way acoustic propagation, i.e. one acoustic transit time without reflection, and have several advantages over the conventional methods of measuring distance using acoustics. First, there is an increase in range because there are no reflection losses and a shorter acoustic path. Second, the interval of space being measured, between the laser side and the target side, is clearly indicated visually to the user by the preferably visible laser beam.

Figure 18:
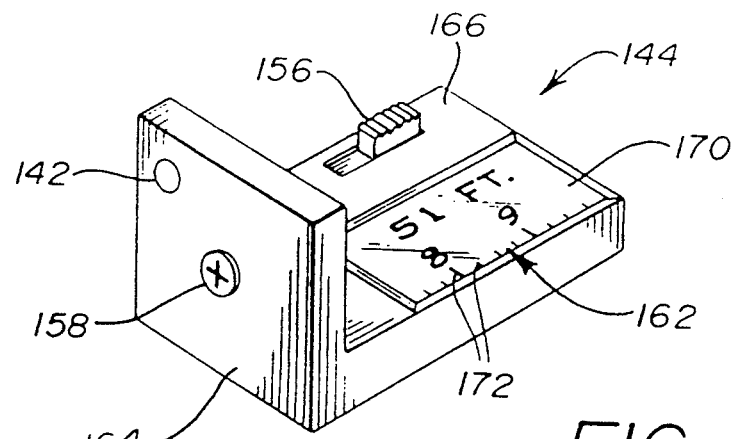
FIG. 18 is a view showing one embodiment of a physical configuration for a target device which forms a component of the apparatus shown in FIG. 17.

FIG. 18 shows one embodiment of a physical configuration for the target device 144. The acoustic transducer/driver 142 may be located on a front surface of a face portion 164 of the target device, with the photodetector 158 positioned nearby. The distance display 162 can be located on a horizontal base portion 166, for example, as shown in FIG. 18. The calculation of the distance via the clock and other associated equipment (i.e. a microprocessor) will of course compensate for the length of the base 166, if the back end of the base is abutted against a vertical surface which is the subject of the measurement.

More preferably, there is provided an LCD 170 which has the capability of displaying pick marks 172 at every 1/16th inch (as an example) along the base 166, with numerical display of feet and inches (or metric, or selectively either). The numbers display in this embodiment preferably is programmed to progressively "move" with respect to the base 166 itself, if the target side device 144 is moved toward or away from the laser side device 148. Thus, the numerical indications of feet and inches indicated in FIG. 18 will progressively move to the right or left as the target device 144 is moved to left or right, respectively. The numerical indications therefore stay put relative to the laser side device (not shown in FIG. 18), providing the user with a real-time adaptive tool which gives the user a scale similar to a tape measure. If the back end of the base 166 is pushed against a wall or other vertical surface, the distance to that surface can actually be read using the scale.

Calculation and display of distance in the embodiment of FIG. 20 occurs in like fashion. The appearance of the target side device 144 is the same as that of FIG. 18 except that the microphone 151 replaces transducer/driver 142.

Although the electronic circuitry for implementing the described calculation and display functions are not shown herein, they are well within the skill of the ordinary engineer and LCD expert. Acoustic measurement in itself is well known, as are the electronics to carry out an LCD display of an acoustic measurement.

In operation of the described embodiment of FIGS. 17 and 18, the measurement loop is initiated on the target side. The on/off switch 156 is switched to the "on" position, activating a transducer 157 to cause the acoustic signal to be sent. When the signal has been received at the laser side device the light signal is sent. The photodetector 158 built into the target device receives the optical signal (i.e. the laser beam or other light beam 140) and converts it to an electrical signal. In this case a clock 160 starts at the time the acoustic signal 146 is sent, and stops at the time the photo current from the photodetector 158 is measured. The time difference between the acoustic pulse generation and the electrical signal received from the photodetector is a measure of the distance separating the two instruments, with the included light beam transit time being negligible. This calculated distance may be displayed on the distance display 162 in the target device housing 144, as indicated schematically in FIG. 17.

If the target side is the transponder, then the sequence is started at the laser side, as by a manual input which causes a pulse of light to be sent.

In operation of the embodiment of FIG. 20, the measurement sequence is initiated at the laser side. The off/on switch is switched to the "on" position activating a transducer to cause the acoustic signal to be sent, and simultaneously triggering modulation of the beam 140. The photodetector 158 built into the target side device 144 receives the optical signal and converts it to an electrical signal. The clock 160 starts at the time the optical signal (and related electrical signal) is received, and stops when the acoustic signal (and related electrical signal) is received. The time difference is a measure of the distance separating the two instruments, with the light beam transit time being negligible. The distance is calculated, and displayed on the distance display 162 in the target side device.

Simultaneous triggering of the light beam and acoustic signal may be accomplished by manual input, such as switching on the laser side device, with repeated measurements preferably being taken (e.g. multiple repetitions per second). Repeated measurements may be taken as long as the laser side device is on, or may be taken for a given timed period, or for a given number of repetitions, after which automatic limiting means terminate the repeated measurement and manual input is again required. At the target side device, measurement may continue to be taken as long as the device is switched on at switch 156. It is desirable to also have a switch position for switch 156 which locks and holds the measurement so that the target side device can be moved with the last reading displayed.

The laser side device shown in FIGS. 17 and 20, i.e. the housing 148, can be incorporated in and form a part of one of the embodiments of the levelling/plumb tools described above. Thus, a level/plumb laser indicator device such as shown in FIGS. 1 through 5 or 6 can incorporate the microphone receiver 151 and other components shown in the device 148, so as to be capable of serving as the laser side device in the acoustic measuring apparatus. A single tool capable of multiple tasks results, the cost of which is less than separate tools as the optics, laser and battery are shared. This provides a very versatile tool with cooperating uses in carpentry, heating and ventilating, plumbing and other layout endeavors.

Figure 19:
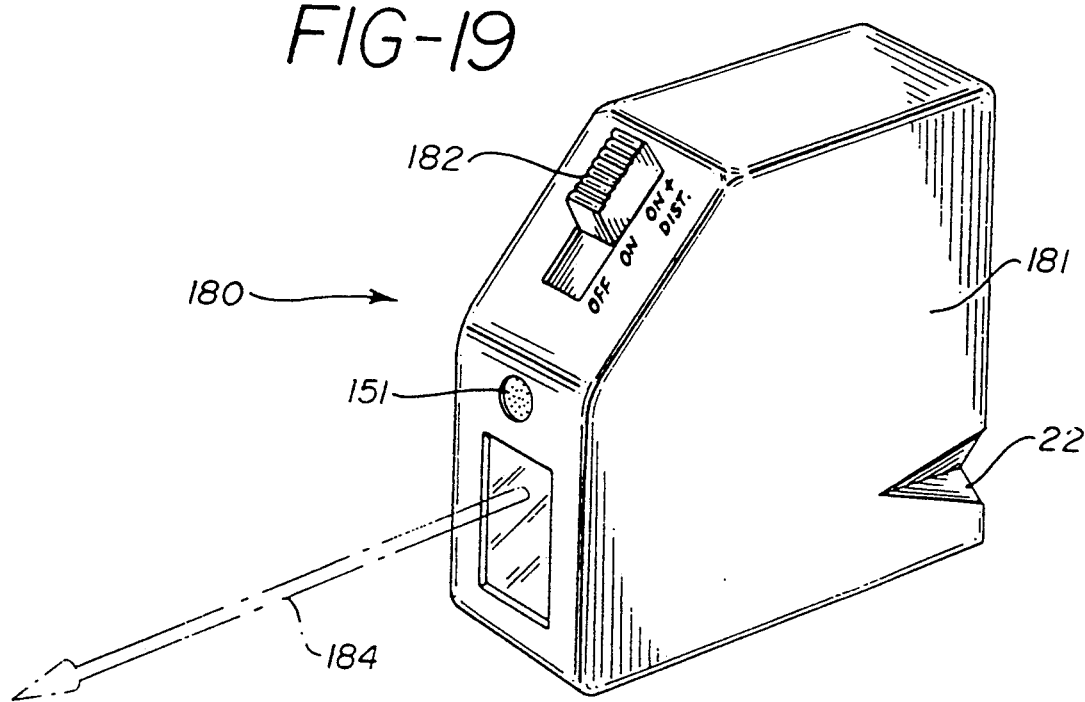
FIG. 19 is a perspective view showing a laser plumb-/level tool such as in FIGS. 1-6, but incorporating acoustic measuring features as described relative to FIG. 17.

FIG. 19 shows a modified laser projecting automatic plumb and level tool 180, incorporated the acoustic distance measuring equipment as shown in the laser side device 148 on the left side of FIGS. 17 or 20, in accordance with one preferred embodiment of the invention. The combined tool 180 preferably is similar to the tools described earlier with respect to the embodiments of FIGS. 1 through 5 and 6, regarding the tilt compensation and other features described in reference to those embodiments.

FIG. 19 shows a housing 181 having an activation switch 182 which includes three defined positions: "OFF", "ON", and "ON+DISTANCE". Thus, for the purposes and use of the instrument described earlier relative to FIGS. 1 through 6, the switch 182 is placed in the "ON" position and the tool is used in the manner described above.

When the tool is to be used for acoustic measurement in conjunction with a second component, i.e. the target side device 144 as shown in FIG. 17 (and which may take the form shown in FIG. 18) and in FIG. 20, the switch 182 is moved to "ON+DISTANCE". The tool 180 is then positioned at one side of a space or room which is to be measured, and a target side device as described above is placed at the other side of the space to be measured. The laser beam 184 is projected, allowing the user to easily position the target side device such that the laser is directed at the incorporated photodetector (158 in FIGS. 17 and 20).

In accordance with FIG. 17, when the target side device sends an acoustic beam, it is received in the microphone 151 as described above, here shown in FIG. 19 on the front of the laser/plumb combination tool's housing 181. Operation is thus similar to that described above.

If the target side device is to be the transponder, rather than the laser tool 180 being the transponder, then the housing 181 includes additional components as described above, and the measuring sequence is initiated by the pulsing of the light beam 184.

In accordance with FIG. 20, the laser side device is as shown in FIG. 19, but the housing 181 includes the driver 142, rather than the microphone 151, on the front of the laser/plumb combination tool's housing 181. The measuring sequence is initiated by simultaneous pulsing of the light beam and projection of the acoustic signal.

In any event, the acoustic measuring assembly preferably makes repeated measurements, as described above, as long as the two components are switched to the distance measuring mode and the laser light beam is directed toward the target. In the combination tools described, assurance may be had that the distance measured is along a level or plumb line, where such measurements are desired.

In a variation of the combination tool described in accordance with FIGS. 17 and 19, the switch 182 in FIG. 19 can be replaced with a simple "OFF"/"ON" switch, and the hand-carryable device 180 can include internal switching electronics which respond to the receipt of the acoustic signal at the microphone/receiver 151, to activate the tool to respond with a characteristic modulation in the laser beam 184.

Similarly, in a further variation of the combination tool, in accordance with FIG. 20 the target side device 144 in FIG. 18 could include a triggering device to initiate the measurement sequence. For example, target side device 144 could include a tool similar to the tools described earlier with respect to the embodiments of FIGS. 1 through 5 and 6 to produce a light beam which projects toward the laser side device 148 or hand-carryable device 180. The laser side 148 or hand-carryable device 180 can include internal switching electronics which respond to the receipt of the light signal at the second photodetector, to activate the tool to respond with simultaneous modulation of the laser beam and the projection of the acoustic signal. Alternatively, other types of receivers may be placed in the laser side device 148 or hand-carryable device 180 to respond to other types of activation signals (e.g. radio, acoustic) which could be sent from activation signal sources in the target side device 144 and serve merely to activate internal switching electronics which initiate the measurement sequence described above.

Electronics for these variations are not shown but can easily be carried out by one of skill in the art.

The laser tool of the invention can also be provided with means for connection to a straightedge or a squaring tool, enabling the horizontal laser beam to be projected at a precise angle (e.g. 90°) from a wall or other surface. Alternatively, a pentaprism can be used to project the laser beam at precisely 90 degrees to its original direction.

Tools described herein are highly versatile and have almost countless uses in the building trades and other trades. As an instrument for achieving plumb, the tool can be placed alongside a wall or any other member intended to be vertical. It can be placed on a floor and spotted on a reference mark overhead, e.g. on a roof or ceiling, to locate a precise position on the floor for passage of pipes or conduits, for example. In the horizontal beam mode, the tool can be used for leveling a mason's work or for checking level of a floor or any other horizontal member. It may be used to locate points on the same level, but a considerable distance apart, such as in framing or layout work. It can be used for leveling and as a pointing beam at the same time, to reference straightness of a parallel wall, pipe, structural member, etc. Laid on a broad side, the tool has many uses as a pointing beam without tilt compensation. It can be set up as desired, as a visible reference line from which straightness of any member or series of members can be checked, such as a stud wall. In this mode the beam can be deliberately directed at low angles upwardly or downwardly, if desired, since the tilt compensation is deactivated. The acoustic measurement feature may be used in cooperation with any of the above listed functions, and the target side device can be used to locate points by distance, where a tape measure would be difficult or impossible to use.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

What is claimed is:

1. A laser beam projecting device for plumbing, leveling, alignment and distance measuring, comprising,
   a hand-carryable housing,
   at least one laser source means mounted within the housing, for producing at least one collimated beam of visible laser light,
   at least one laser beam exit window in the housing,
   beam directing means in the housing for directing at least one beam from the at least one laser source means at a predetermined angular orientation out of the housing through at least one exit window when said housing is in a first position,
   tilt compensation means in the housing and associated with the beam directing means for correcting for relatively small tilt angles of the housing when in positions other than a true first position, and for projecting the at least one beam through the at least one exit window in substantially the true predetermined angular orientation despite such relatively small tilt angles,
   means associated with the laser beam projecting device for distance measuring, including:
   means for characterizing at least one collimated beam of visible laser light produced at said at least one laser source means, so that a modulated or pulsed beam is projected from said hand-carryable housing,
   means for projecting an acoustic signal from said hand-carryable housing for use in distance measuring generally along said at least one collimated beam in substantially a true predetermined angular orientation.

2. The apparatus of claim 1, wherein:
   the housing includes at least two laser beam exit windows,
   the beam directing means in the housing for directing at least one beam from the at least one laser source means directs at least one beam at a vertical orientation out of the housing through at least one exit window, and directs at least one beam at a horizontal orientation out of the housing through at least one exit window, when the housing is in said first position, and
   the tilt compensation means projects the beams through the exit windows in substantially true vertical orientation and substantially true horizontal orientation despite such relatively small tilt angles.

3. The apparatus of claim 1, wherein:
   the beam directing means in the housing for directing at least one beam from the at least one laser source means, directs a beam at a vertical orientation out of the housing through at least one exit window when the housing is in the first position, and further directs at least one beam from the at least one laser source means at a horizontal orientation out of the housing through at least one exit window, when the housing is in a second position, and
   the tilt compensation means projects the beams through the at least one exit window in substantially true vertical orientation or substantially true horizontal orientation despite such relatively small tilt angles.

4. The apparatus of claim 1 wherein said means associated with the laser beam projecting device for distance measuring, further includes:
   a separate, unconnected component as a target means with photodetector means for receiving and detecting a modulated or pulsed laser beam projected from the hand-carryable housing, and with acoustic signal receiver means for receiving an acoustic signal transmitted directly from the hand-carryable housing, without reflection, and
   means coacting in the hand-carryable housing and separate target means for initiating and carrying out a timing event, said means coacting comprising:
   means for initiating simultaneous transmission of the acoustic signal and a light signal emitted as a modulated or pulsed laser beam, from the hand-carryable housing,
   means for measuring the time interval between receipt of the modulated or pulsed laser beam at the target means and the receipt of the acoustic signal at the target means, and
   associated means in the target means for calculating and displaying the distance between appropriate points on the hand-carryable housing and the target means in response to said measurement of the time interval.

5. The apparatus of claim 4, wherein:
   the means for projecting an acoustic signal from the hand-carryable housing comprises an acoustic driver located in the hand-carryable housing, serving as the means for transmitting an acoustic signal,
   the means in the target means for measuring the time interval comprises a clock means connected to the photodetector and the acoustic signal receiver means for timing the interval between start and stop events in which the modulated or pulsed laser beam is received and the acoustic signal is received, respectively, and the means associated with the laser beam projecting device for distance measuring further includes manual triggering means in the hand-carryable housing for beginning the distance measuring sequence by initiating the simultaneous transmission from the hand-carryable housing of the acoustic signal and a light signal emitted as a modulated or pulsed laser beam, whereby upon the transmission of the light signal, the photodetector indicates the beginning of a time interval which ends when the acoustic signal has been received, and the means for calculating and displaying uses the measured time interval for calculating and displaying the distance.

6. The apparatus of claim 4, wherein the associated means for calculating and displaying the distance includes liquid crystal display means on said second component for displaying a numerical distance scale which is movable relative to the second component as the distance between the first and second components varies, such that the LCD distance scale appears to the user as a tape measure with particular distance indications fixed relative to said first component and movable relative to said second component.

7. The apparatus of claim 1 wherein said hand-carryable housing has at least two sides capable of resting stably on a flat surface, the two sides being substantially perpendicular to each other for substantially positioning said housing in a first position and a second position, and said housing further includes two broad sides.

8. A laser beam projecting device for plumbing, leveling, alignment and distance measuring, comprising,
   a hand-carryable housing,
   laser source means mounted within the housing, for producing at least one collimated beam of visible laser light,
   a laser beam exit window in the housing,
   beam directing means in the housing for directing a beam from the laser source means vertically out of the housing through the exit window when said housing is in a first position, and for directing a beam from the laser source means horizontally out of the housing through the exit window when said housing is in a second position,
   tilt compensation means in the housing and associated with the beam directing means for correcting for relatively small tilt angles of the housing when in position other than true first and second positions, and for projecting the beam through the exit window in substantially true vertical orientation or substantially true horizontal orientation despite such relatively small tilt angles, and
   means associated with the laser beam projecting device for distance measuring, including:
   means for characterizing at least one collimated beam of visible laser light produced at said laser source means, so that a modulated or pulsed beam is projected from said hand-carryable housing,
   means for projecting an acoustic signal from said hand-carryable housing in substantially true vertical orientation or substantially true horizontal orientation,
   a separate, unconnected component as a target means with photodetector means for receiving and detecting a modulated or pulsed laser beam projected from the hand-carryable housing, and with acoustic signal receiver means for receiving an acoustic signal transmitted directly from the hand-carryable housing, without reflection, and means coacting in the hand-carryable housing and separate target means for initiating and carrying out a timing event, said means coacting comprising:
   means for initiating simultaneous transmission of the acoustic signal and a light signal emitted as a modulated or pulsed laser beam, from the hand-carryable housing,
   means for measuring the time interval between receipt of the modulated or pulsed laser beam at the target means and the receipt of the acoustic signal at the target means, and
   associated means in the target means for calculating and displaying the distance between appropriate points on the hand-carryable housing and the target means in response to said measurement of the time interval.

9. An acoustic distance measuring device, comprising,
   a first component including:
      a characteristic light signal transmitting means, for being located at a first position; and
      acoustic means for projecting an acoustic signal from the first component;
   a second component which is separate from the first component and which may be placed at a second position, the distance of which from the first position is to be measured, the second component including:
      a target means with photodetector means for receiving and detecting a characteristic light signal transmitted from the first component, and
      acoustic signal receiver means for receiving the acoustic signal projected from the first component toward the target means, and
      means coacting between the first component and the second component for measuring the time interval between receipt of the characteristic light signal at the photodetector means for receiving and receipt of the acoustic signal at the acoustic signal receiver means, with associated means for calculating and displaying the distance between the first component and the second component in response to said measurement of the time interval.

10. The apparatus of claim 9 wherein said means coacting comprises:
   means for simultaneously initiating both the acoustic means for projecting to project an acoustic signal and the characteristic light signal transmitting means to transmit a characteristic light signal from the first component to the second component.

11. The apparatus of claim 9, wherein the associated means for calculating and displaying the distance includes liquid crystal display means on said second component for displaying a numerical distance scale which is movable relative to the second component as the distance between the first and second components varies, such that the LCD distance scale appears to the user as a tape measure with particular distance indications fixed relative to said first component and movable relative to said second component.

12. An acoustic distance measuring device, comprising, a first component for being located at a first position, and a second component which is separate from the first component and which may be placed at a second position, the distance of which from the first position is to be measured, one way acoustic transmission means including:

acoustic means for projecting an acoustic signal from said first component to said second component, and acoustic signal receiver means for receiving the acoustic signal at said second component;

light signal means for aligning the one way acoustic transmission means, including:

a characteristic light signal transmitting means for transmitting a characteristic light signal from said first component to said second component, and a photodetector means for receiving and detecting the characteristic light signal at the second component;

means coacting in said first and second components for initiating and carrying out a timing event which is clocked by one acoustic transit time and one optical transit time, without reflection, with associated means for calculating and displaying the distance between the first component and the second component.

13. The apparatus of claim 12 wherein said means coacting comprises means in said first component for simultaneously initiating both the acoustic means to project an acoustic signal and the characteristic light signal transmitting means to transmit a characteristic light signal from the first component to the second component.

14. The apparatus of claim 13 wherein said means for simultaneously initiating further comprises means for automatically and repeatedly activating said means for simultaneously initiating.

15. The apparatus of claim 14 wherein said means for automatically and repeatedly activating said means for simultaneously initiating includes automatic means for limiting such automatic and repeated activation.

16. The apparatus of claim 13 wherein the means for simultaneously initiating includes manual triggering means in the hand-carryable housing.

17. The apparatus of claim 13 wherein said means coacting further includes:

an activation signal source in said second component to project an activation signal; and an activation signal receiver in said first component to receive the activation signal; and internal switching electronics to activate said means for simultaneously initiating.

18. The apparatus of claim 13 wherein:

said means coacting further comprises responsive means in said second component for clocking the time interval between a start event comprising receipt of the characteristic light signal at the photodetector means and a stop event comprising receipt of the acoustic signal at the acoustic signal receiver means; and said associated means for calculating distance and displaying are disposed in the second component and use the timed interval between start and stop events for calculating and displaying the distance.

19. The apparatus of claim 12, wherein the associated means for calculating and displaying the distance includes liquid crystal display means on one of said first and second components, for displaying a numerical distance scale which is movable relative to the component which includes the liquid crystal display means, as the distance between the components varies, such that the LCD distance scale appears to the user as a tape measure with particular distance indications fixed relative to the other of said first and second components and movable relative to the component which includes the liquid crystal display means.

* * * * *